US012036647B2

(12) United States Patent
Bao et al.

(10) Patent No.: US 12,036,647 B2
(45) Date of Patent: Jul. 16, 2024

(54) INNER SUPPORT CLAMP

(71) Applicant: BEIJING SOFT ROBOT TECH. CO., LTD., Beijing (CN)

(72) Inventors: Lei Bao, Suzhou (CN); Lingfeng Zhang, Suzhou (CN)

(73) Assignee: BEIJING SOFT ROBOT TECH. CO., LTD., Beijing (CN)

( * ) Notice: Subject to any disclaimer, the term of this patent is extended or adjusted under 35 U.S.C. 154(b) by 876 days.

(21) Appl. No.: 17/012,162

(22) Filed: Sep. 4, 2020

(65) Prior Publication Data

US 2020/0406426 A1 Dec. 31, 2020

Related U.S. Application Data

(63) Continuation of application No. PCT/CN2019/077351, filed on Mar. 7, 2019.

(30) Foreign Application Priority Data

Mar. 7, 2018 (CN) ........................ 201810188339.7

(51) Int. Cl.
*B25B 5/06* (2006.01)

(52) U.S. Cl.
CPC .................................... *B25B 5/065* (2013.01)

(58) Field of Classification Search
CPC ................................ B25B 5/065; B25B 11/00
See application file for complete search history.

(56) References Cited

U.S. PATENT DOCUMENTS 881,914 A * 3/1908 Farnham ................. B25B 5/065 269/22
3,626,506 A * 12/1971 Spieth ..................... F16B 21/10 279/2.01

(Continued)

FOREIGN PATENT DOCUMENTS

CN 102366952 A 3/2012
CN 202607531 U 12/2012

(Continued)

OTHER PUBLICATIONS

International Search Report in PCT/CN2019/077351 dated Jun. 12, 2019, 7 pages.

(Continued)

*Primary Examiner* — David M Upchurch
(74) *Attorney, Agent, or Firm* — METIS IP LLC

(57) ABSTRACT

An inner support clamp is provided. The inner support clamp may include a first elastic component and a supporting component. The first elastic component may hermetically cover at least a portion of the supporting component such that the first elastic component expands outward when the first elastic component is inflated by an inflation and deflation device. The inner support clamp may be with a small size, a light weight, and/or a simple structure, thereby reducing the manufacture cost of the inner support clamp. The inner support clamp may clamp objects with different sizes and shapes rapidly and stably. For a fragile, soft, or bottle-shape object, or an object with a regular or irregular shape, the inner support clamp may clamp the object safely and not cause damage to the object.

20 Claims, 20 Drawing Sheets

(56) References Cited

U.S. PATENT DOCUMENTS

| | | | | |
|---|---|---|---|---|
| 5,855,446 | A * | 1/1999 | Disborg | B23B 31/305 403/373 |
| 6,629,584 | B1 * | 10/2003 | Muller | F16D 65/18 403/31 |
| 2010/0244345 | A1 | 9/2010 | Hirakawa et al. | |

FOREIGN PATENT DOCUMENTS

| | | | |
|---|---|---|---|
| CN | 103341861 | A | 10/2013 |
| CN | 104924317 | A | 9/2015 |
| CN | 205432293 | U | 8/2016 |
| CN | 106041996 | A | 10/2016 |
| CN | 206265858 | U | 6/2017 |
| CN | 106976029 | A | 7/2017 |
| CN | 206344045 | U | 7/2017 |
| CN | 107175677 | A | 9/2017 |
| CN | 108326777 | A | 7/2018 |
| CN | 207997260 | U | 10/2018 |
| JP | H0228492 | A | 1/1990 |
| JP | H0584671 | A | 4/1993 |
| JP | 2005007569 | A | 1/2005 |

OTHER PUBLICATIONS

Written Opinion in PCT/CN2019/077351 dated Jun. 12, 2019, 9 pages.
First Office Action in Chinese Application No. 201810188339.7 mailed on Oct. 16, 2023, 14 pages.
The Second Office Action in Chinese Application No. 201810188339.7 mailed on Dec. 13, 2023, 13 pages.

* cited by examiner

1300

1300

INNER SUPPORT CLAMP

CROSS-REFERENCE TO RELATED APPLICATION

This application is a Continuation of International Application No. PCT/CN2019/077351, filed on Mar. 7, 2019, which claims priority to Chinese Patent Application No. 201810188339.7, filed on Mar. 7, 2018, the contents of each of which are hereby incorporated by reference.

TECHNICAL FIELD

The present disclosure relates to a clamp, and in particular, to an inner support clamp.

BACKGROUND

On some occasions (e.g., in industrial production, daily life, etc.), an object may need to be clamped. However, sometimes, it is inconvenient to contact with an outside surface of the object directly. The object may be clamped by a clamping device that is supported by an inside wall of the object. For an object with a thin wall and/or a fragile inside wall, a rigid clamp (e.g., a rigid clamp made of metal, etc.) may cause damage to the object and cannot be used to clamp the object. For an object with a relatively small internal space or a complex contour, a customized clamp may need to be manufactured. Such customized claim may not be applied to other objects, have a high production cost of the clamp, and an unstable structure if it is improperly designed.

Conventionally, an interior support clamp may be used to clamp an object based on a deformation of an elastic structure driven by a cylinder. Due to the limitation of the diameter and/or the air pressure of the cylinder, the interior support clamp may be unsuitable to clamp a fragile object and/or a soft object (e.g., a glass product with a thin wall, a coarse embryo of ceramic product, etc.). Therefore, it is desirable to provide an internal support clamp that can be used in various occasions.

SUMMARY

According to an aspect of the present disclosure, an inner support clamp is provided. The inner support clamp may include a supporting component and a first elastic component. A connection part may be disposed on the supporting component. The connection part may be connected to an external device. The first elastic component may hermetically cover at least a portion of the supporting component such that the first elastic component expands outward when the first elastic component is inflated by an inflation and deflation device.

In some embodiments, a reinforcing component may be disposed on at least one of an outer wall or an inner wall of the first elastic component. At least one of a wear layer, an anti-indentation layer, an oil-proof layer, or an anti-static layer may be disposed on the outer wall of the first elastic component.

In some embodiments, the reinforcing component may include at least one of a reinforcing rib or a rough surface, and the at least one of the reinforcing rib or the rough surface may be disposed on the first elastic component.

In some embodiments, the reinforcing rib may include at least one of a stripe-shaped protrusion, a wave-shaped protrusion, and a zigzag-shaped protrusion.

In some embodiments, the at least one of the outer wall or the inner wall of the first elastic component may include the rough surface, and the rough surface may have at least one of a texture and a micro bump.

In some embodiments, the first elastic component may include an elastic material.

In some embodiments, the elastic material may include silicone or rubber.

In some embodiments, a waist of the first elastic component may be concaved when the inner support clamp is in a mounting state. The first elastic component may have a conformal shape when the inner support clamp is in the mounting state.

In some embodiments, an internal concave portion may be disposed in a central part of the supporting component. A chamber may be formed between the first elastic component and the supporting component.

In some embodiments, a clamping part may be disposed on the supporting component. An end of the first elastic component may be engaged with the clamping part when the inner support clamp is in a mounting state, and the first elastic component may hermetically cover at least a portion of the supporting component.

In some embodiments, the connection part disposed on the supporting component may include a thread connection part or an engagement connection part.

In some embodiments, a first gas channel may be disposed within the supporting component. A chamber formed between the first elastic component and the supporting component may be connected to the inflation and deflation device through the first gas channel.

In some embodiments, the inner support clamp may further include a connection component. The connection component may be connected to the supporting component and configured to connect the inner support clamp to the external device.

In some embodiments, the connection component may include an upper connection unit and a lower connection unit. The upper connecting unit may be connected to the external device and the lower connection unit may be connected to the connection part disposed on the supporting component.

In some embodiments, the upper connection unit may include a thread connection unit or an engagement connection unit. The lower connection unit may include a second thread connection unit or a second engagement connection unit.

In some embodiments, the connection component may further include a crimping unit. The crimping unit may include a protrusion unit formed between the upper connection unit and the lower connection unit, the protrusion unit protruding outward along a radial direction of the inner support clamp. The crimping unit may press the first elastic component against the supporting component when the inner support clamp is in a mounting state.

In some embodiments, a second gas channel may be disposed in the connection component. A chamber formed between the first elastic component and the supporting component may be connected to the inflation and deflation device through the second gas channel.

In some embodiments, the inner support clamp may include a sealing component. The sealing component may be disposed at a joint between the first elastic component and the supporting component to seal the inner support clamp.

In some embodiments, the sealing component may include a sealing block. An inner wall of the sealing block may be hermetically connected to an outer wall of the joint between the first elastic component and the supporting component.

In some embodiments, the inner support clamp may further include a gas supplying interface. A chamber formed between the first elastic component and the supporting component may be connected to the inflation and deflation device through the gas supplying interface.

In some embodiments, the inner support clamp may further include a telescoping mechanism. The supporting component may be connected to the telescoping mechanism directly or via the connection component.

In some embodiments, the telescoping mechanism may include a telescoping rod. The supporting component may be connected to a telescoping end of the telescoping rod directly or via the connection component, or the telescoping mechanism may include a spring and a traction unit, the supporting component may be connected to the spring and the traction unit directly or via the connection component, and the supporting component may be retractable along with a stretch of the spring caused by the traction of the traction unit.

In some embodiments, the inner support clamp may further include a buffer component. The supporting component may be connected to the buffer component directly or via the connection component.

In some embodiments, the buffer component may include at least one of a buffer, a buffer pad, a buffer sheet, or a buffer spring, or the buffer component may include a telescoping mechanism, a pressure sensor, and a controller. The telescoping mechanism and the pressure sensor may be connected to the controller. The supporting component may be connected to the telescoping mechanism. The pressure sensor may be disposed at a joint between the supporting component and the telescoping mechanism.

According to another aspect of the present disclosure, a clamp is provided. The clamp may include an inner support clamp and an external clamp. The external clamp may be disposed on the inner support clamp.

In some embodiments, the external clamp may include a flexible gripper. The flexible gripper may be coaxial with the inner support clamp. The flexible gripper and the inner support clamp may be movable relative to each other. The flexible gripper may clamp an object to be clamped when the clamp is in use. The external clamp may include at least one of a ring-shaped airbag clamp, a hydraulic gripper, a pneumatic gripper, or an electric gripper.

According to yet another aspect of the present disclosure, a clamp is provided. The clamp may include an inner support clamp and a guiding device. The guiding device may be detachably disposed on the inner support clamp.

In some embodiments, the guiding device may have a shape of a taper or a trumpet. The guiding device may be detachably disposed at an extending end of the inner support clamp via a thread connection or an engagement connection.

In some embodiments, the guiding device may include a guide rod and a guide sleeve. The inner support clamp may be mechanically connected to the guide rod. The guide sleeve may be sleeved on the guide rod. A position limiting groove may be disposed on the guide rod along an axial direction of the guide rod. A position limiting protrusion may be disposed within the guide sleeve. When the clamp is in a mounting state, the position limiting protrusion may be engaged in the position limiting protrusion to prevent the guide rod from rotating within the guide sleeve and cause the inner support clamp to move with the guide rod along a direction limited by the guide sleeve.

In some embodiments, the clamp may further include an external clamp. The external clamp may be disposed on the inner support clamp.

According to yet another aspect of the present disclosure, a clamp is provided. The clamp may include an inner support clamp and a disengagement device. In some embodiments, the disengagement device may include an air-jet structure. The air-jet structure may be disposed on the inner support clamp, and the air-jet structure may be connected to the inflation and deflation device when the disengagement device is in use. In some embodiments, the disengagement device may include a telescoping push rod, and the telescopic push rod may be disposed on the inner support clamp. In some embodiments, the disengagement device may include a vibration device, and the inner support clamp may be disposed on the vibration device.

According to yet another aspect of the present disclosure, an inner support clamp is provided. The inner support clamp may include a gas channel, an airbag, a supporting component, and a connection component. The airbag may include an elastic material and cover at least a portion of the supporting component. A chamber may be formed between the airbag and the supporting component. At least one port of the gas channel may pass through the supporting component and connected to the chamber. The connection component may be connected to the supporting component and configured to connect the inner support clamp to an external device.

In some embodiments, the inner support clamp may further include a sealing component configured to seal the inner support clamp.

In some embodiments, the sealing component may be disposed an outer wall of the airbag or the supporting component.

In some embodiments, the sealing component may include a sealing block. An inner wall of the sealing block may be hermetically connected to the outer wall of the airbag or the supporting component.

In some embodiments, a waist of the airbag may be concaved.

In some embodiments, the airbag may include silica gel.

In some embodiments, the inner support clamp may further include a gas supplying interface. A port of the gas supplying interface may be connected to a port of the gas channel, and another port of the gas supplying interface may be connected to an inflation and deflation device.

In some embodiments, the airbag may cover an outer surface of the supporting component.

In some embodiments, the connection component may be connected to the outer surface of the supporting component in a vertical direction.

In some embodiments, the connection component may be connected to one or more second clamps.

In some embodiments, the inner support clamp further may include a bracket. The bracket may be connected to the connection component and one or more second clamps.

In some embodiments, the one or more second clamps may include at least one second inner support clamp.

In some embodiments, the inner support clamp may include a gas channel control component. The gas channel control component may be connected to one or more gas channels of the at least one second inner support clamp.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
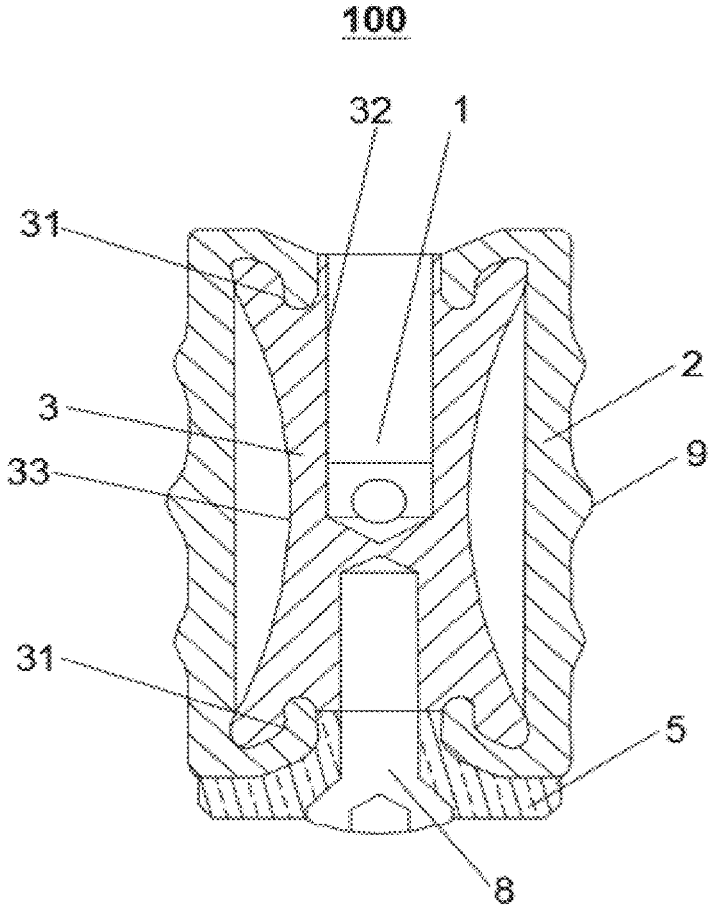
FIG. 1 is a schematic diagram illustrating a cross-section of an exemplary inner support clamp according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention.

Spatial and functional relationships between elements (for example, between layers) are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

FIG. 1 is a schematic diagram illustrating a cross-section of an exemplary inner support clamp 100 according to some embodiments of the present disclosure.

As shown in FIG. 1, the inner support clamp 100 may include a first elastic component 2 and a supporting component 3.

In some embodiments, the first elastic component 2 may be disposed on the supporting component 3 and hermetically cover the entire or a portion of an outer surface of the supporting component 3.

In some embodiments, a clamping part 31 may be disposed on the supporting component 3. When the inner support clamp 100 is in a mounting state, an upper end and/or a lower end of the first elastic component 2 may be engaged with the clamping part 31. The first elastic component 2 may be hermetically disposed on the supporting component 3 and cover the entire of the outer surface of the supporting component 3. For example, as shown in FIG. 1, the clamping part 31 may be disposed on each of a first end (also referred to as a top end) and a second end (also referred to as a bottom end) of the supporting component 3. When the inner support clamp 100 is in the mounting state, the first elastic component 2 may be disposed on the supporting component 3. The upper end of the first elastic component 2 may be mounted on the clamping part 31 that is disposed on the first end of the supporting component 3. The lower end of the first elastic component 2 may be mounted on the clamping part 31 that is disposed on the second end of the supporting component 3. The upper end and/or the lower end of the first elastic component 2 may be hermetically connected to the clamping part(s) 31 via various sealing modes, such as an adhesive sealing mode, a pressure sealing mode, an engagement sealing mode, a sealing mode using a sealing element, etc. In some embodiments, the first elastic component 2 may be sleeved on the supporting component 3, cover the entire of the outer surface of the supporting component 3, and hermetically connected to the supporting component 3. The first elastic component 2 may cover the outer surface of the supporting component 3. When the inner support clamp 100 is inflated (i.e., the inner support clamp 100 is in a positive air pressure state), the inner support clamp 100 may have the shape of a lantern, an ellipsoid, a drum, etc.

Figure 6:
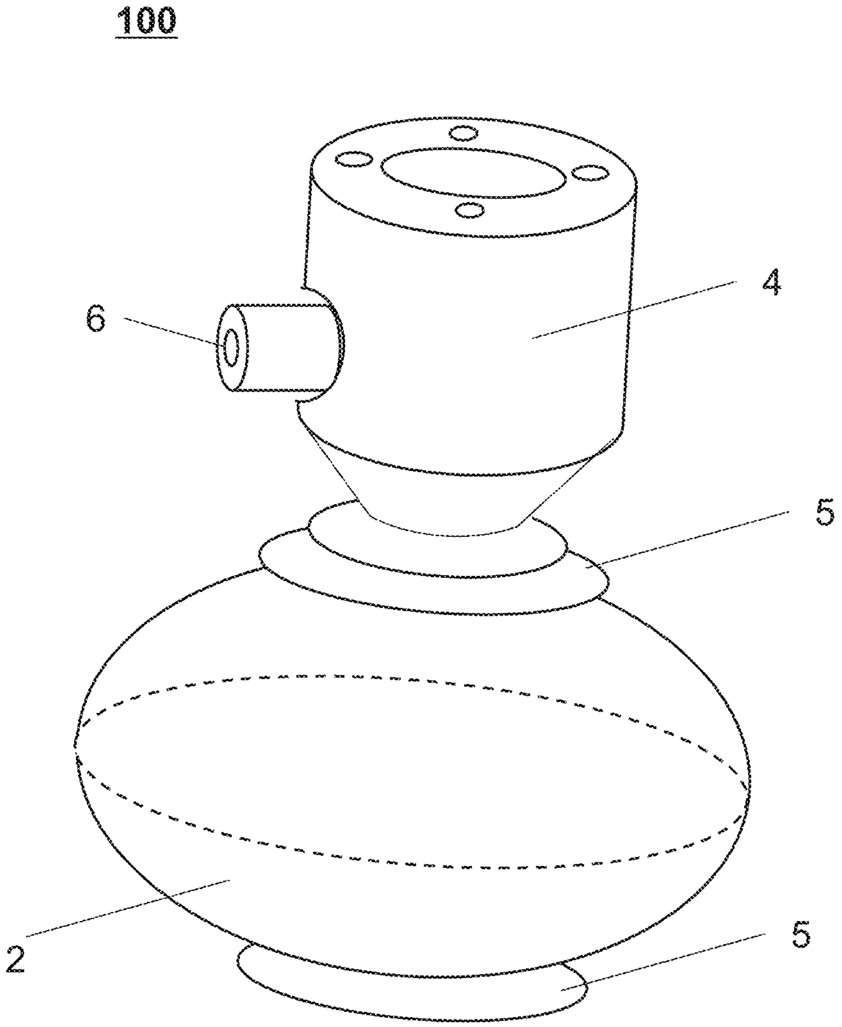
FIG. 6 is a schematic diagram illustrating an inner support clamp when it is inflated according to some embodiments of the present disclosure.
Figure 7:
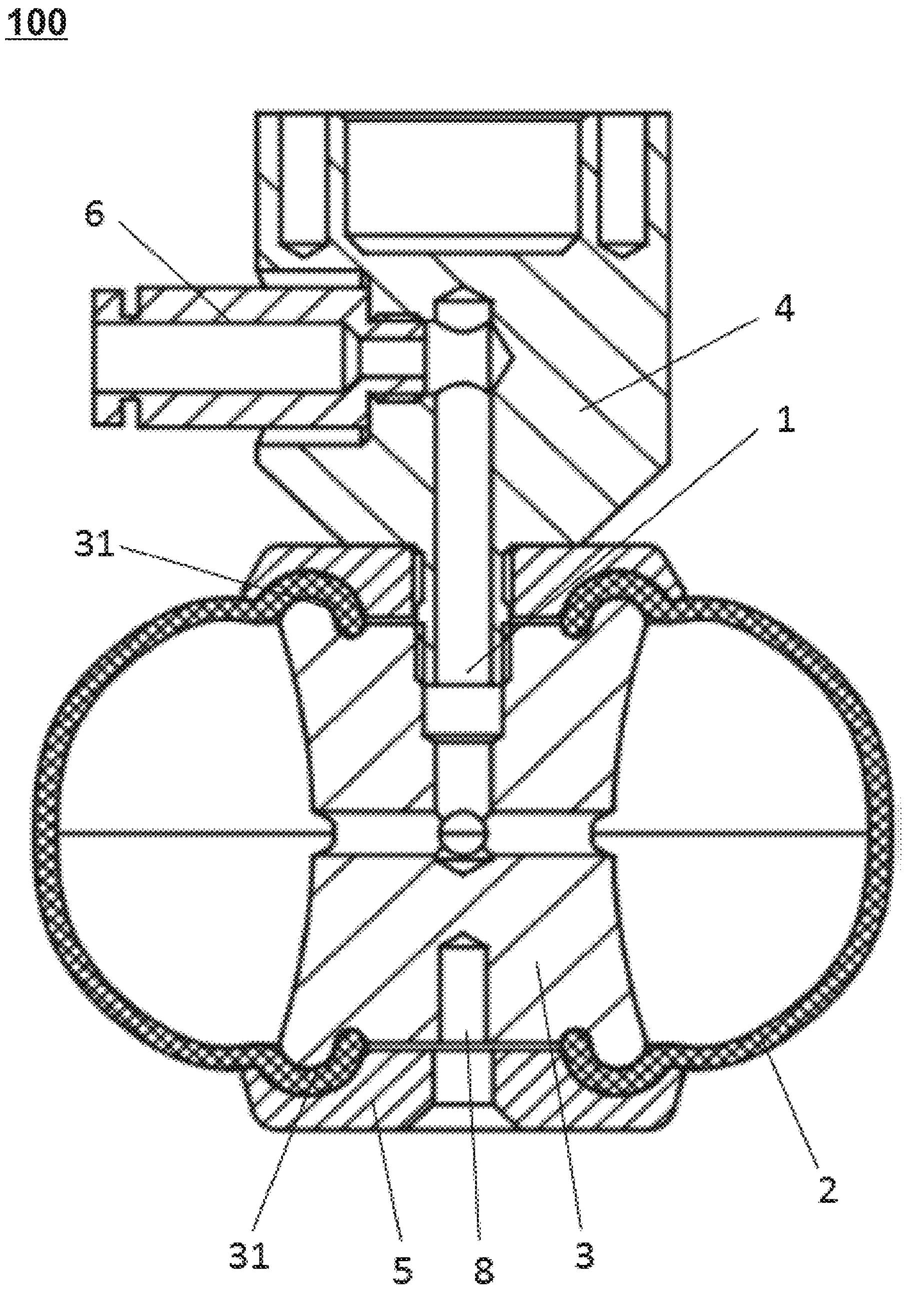
FIG. 7 is a schematic diagram illustrating a cross-section of the inner support clamp shown in FIG. 6 according to some embodiments of the present disclosure.
Figure 8:
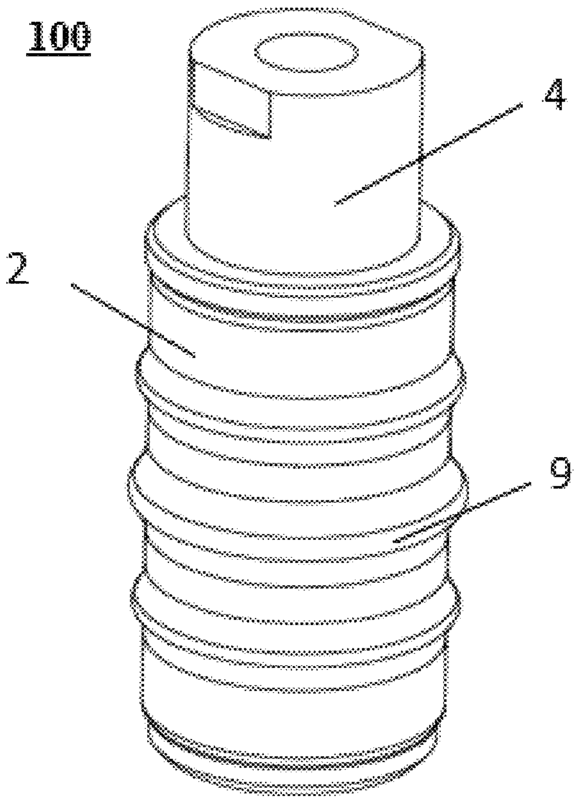
FIG. 8 is a schematic diagram illustrating an exemplary inner support clamp according to some embodiments of the present disclosure.
Figure 9:
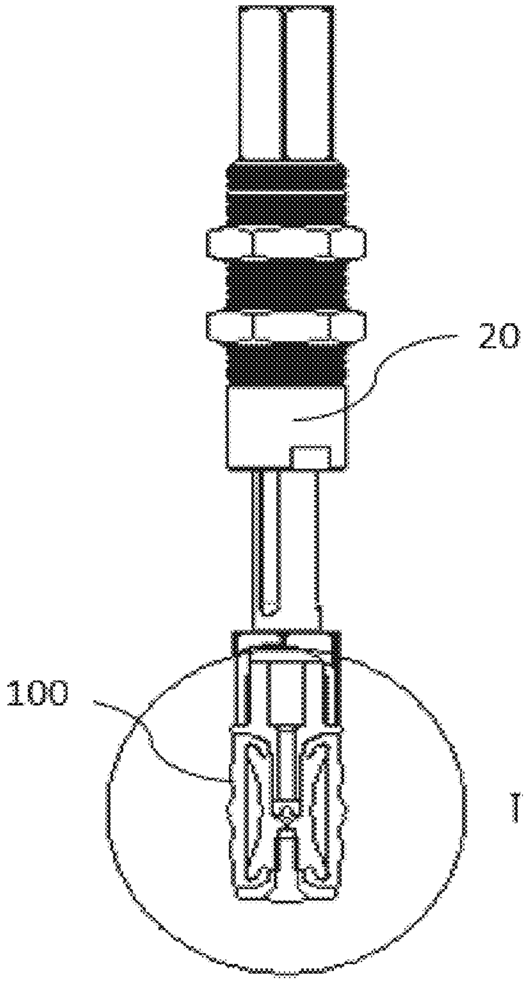
FIG. 9 is a schematic diagram illustrating an exemplary inner support clamp according to some embodiments of the present disclosure.

FIG. 6 is a schematic diagram illustrating the inner support clamp 100 when it is inflated according to some embodiments of the present disclosure. FIG. 7 is a schematic diagram illustrating a cross-section of the inner support clamp 100 as shown in FIG. 6.

As shown in FIGS. 6-7, when the inner support clamp 100 is inflated, the first elastic component 2 may contact with an inner surface of an object along the circumference of the first elastic component 2 to clamp the object.

In some embodiments, the first elastic component 2 may be hermetically disposed on the supporting component 3 and cover a portion of an outer surface of the supporting component 3.

For example, the clamping part 31 may be disposed on the supporting component 3. When the inner support clamp 100 is in a mounting state, an upper end and/or the lower end of the first elastic component 2 may be engaged with the clamping part(s) 31. The first elastic component 2 may be hermetically disposed on the supporting component 3 and cover a portion of the outer surface of the supporting component 3.

Figure 2:
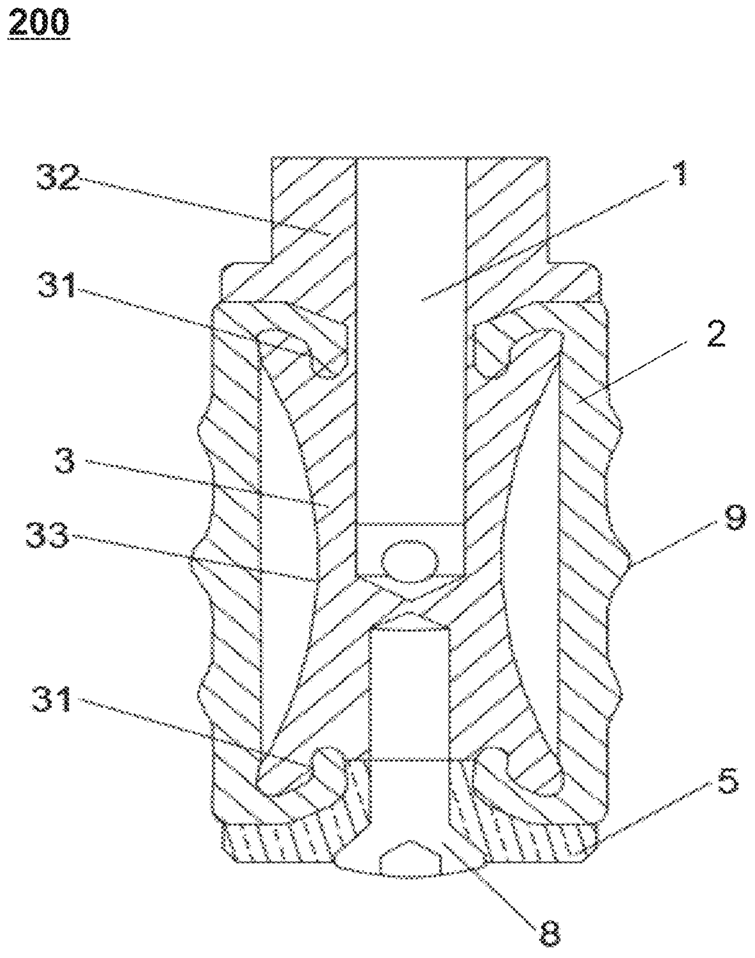
FIG. 2 is a schematic diagram illustrating a cross-section of an exemplary inner support clamp according to some embodiments of the present disclosure.

FIG. 2 is a schematic diagram illustrating a cross-section of an exemplary inner support clamp 200 according to some embodiments of the present disclosure. As shown in FIG. 2, a clamping part 31 may be disposed on each of a central part and a bottom part of an outer surface of the supporting component 3. When the inner support clamp 200 is in a mounting state, a first elastic component 2 may be disposed on the supporting component 3. An upper end of the first elastic component 2 may be disposed on the clamping part 31 that is disposed on the central part of the supporting component 3. A lower end of the first elastic component 2 may be disposed on the clamping part 31 that is disposed on a bottom end of the supporting component 3. The upper end and/or the lower end of the first elastic component 2 may be hermetically connected to the clamping part(s) 31 via various sealing modes, such as an adhesive sealing mode, a pressure sealing mode, an engagement sealing mode, a sealing mode using a sealing element, etc. The first elastic component 2 may be sleeved on the supporting component 3, cover a portion of the outer surface of the supporting component 3, and hermetically connected to the supporting component 3.

In some embodiments, the first elastic component 2 may include a cylindrical elastic component, which may be formed integrally or by an elastic sheet in a curled manner.

The cylindrical elastic component may be disposed on the supporting component 3 and cover at least a portion of the outer surface of the supporting component 3. That is, the cylindrical elastic component may be disposed on the supporting component 3 and cover the entire or a portion of the outer surface of the supporting component 3. A chamber (e.g., an airbag) may be formed between the first elastic component 2 and the outer surface of the supporting component 3. When the inner support clamp 200 is in a mounting state or use, the chamber formed between the first elastic component 2 and the outer surface of the supporting component 3 may be connected to an inflation and deflation device. The chamber formed between the first elastic component 2 and the outer surface of the supporting component 3 may be inflated with a gas, which may cause an outward expansion of the first elastic component 2. When the gas inflated into the chamber is deflated, the first elastic component 2 may shrink. When the first elastic component 2 is in an uninflated state or an evacuated state, the inner support clamp 200 may be inserted into an object. The inflation and deflation device may inflate gas into the chamber between the first elastic component 2 and the outer surface of the supporting component 3 to cause an outward expansion of the first elastic component 2, and the expanded first elastic component 2 may generate a clamping force on the object. The first elastic component 2 may clamp the object using the clamping force.

Figure 4:
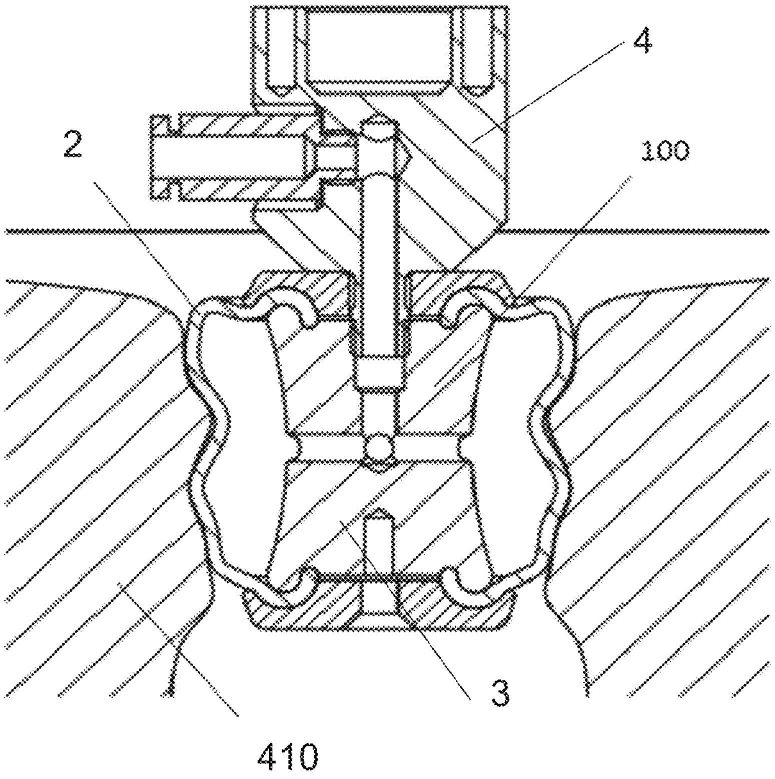
FIG. 4 is a schematic diagram illustrating a cross-section of an exemplary inner support clamp according to some embodiments of the present disclosure.

FIG. 4 is a schematic diagram illustrating a cross-section of the inner support clamp 100 when in use according to some embodiments of the present disclosure. As shown in FIG. 4, the first elastic component 2 may be placed within an object 410, and the first elastic component 2 may be expanded outward and generate a clamping force to clamp the object 410.

After the first elastic component 2 clamps the object 410, the gas in the chamber formed between the first elastic component 2 and the outer surface of the supporting component 3 may be deflated, and the inner support clamp 100 may be taken out from the object 410. The air pressure in the chamber formed between the first elastic component 2 and the outer surface of the supporting component 3 may be determined and/or adjusted according to an actual need, and the clamping force of the first elastic component 2 on the object may be adjusted, so that the inner support clamp 100 may be suitable for clamping various objects, even an object with a thin wall or a fragile object.

In some embodiments, the first elastic component 2 may include an airbag. The airbag may be disposed on the supporting component 3 and hermetically cover the entire or a portion of the outer surface of the supporting component 3. When the inner support clamp is in a mounting state or in use, the airbag may be connected to an inflation and deflation device. In some embodiments, the airbag may be placed into an object and expanded outward to clamp the object after the inflation and deflation device inflates gas into the airbag. In some embodiments, the inflation and deflation device may deflate the gas in the airbag, and airbag may shrink.

In some embodiments, a waist of the first elastic component 2 may be concaved.

Figure 3:
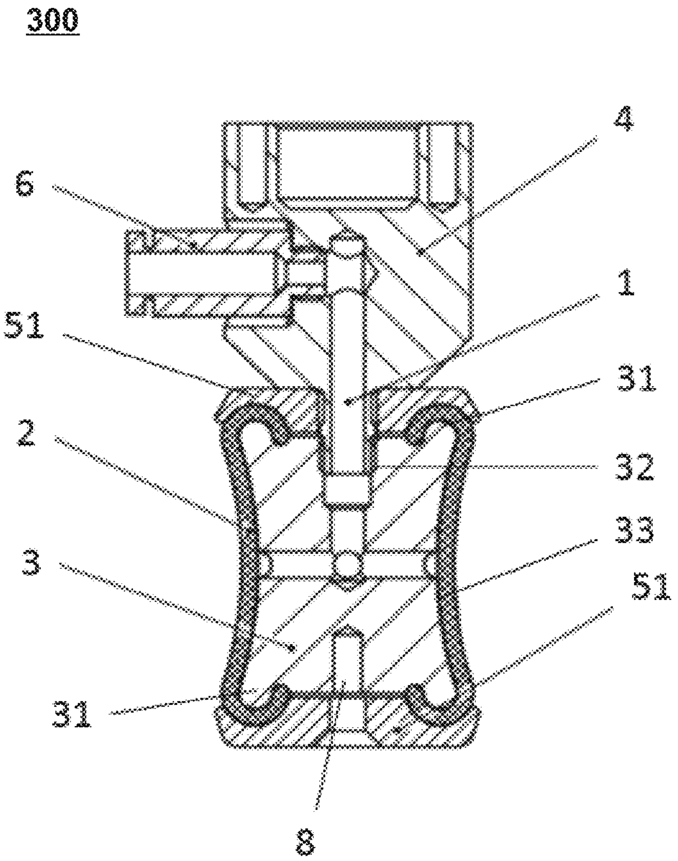
FIG. 3 is a schematic diagram illustrating a cross-section of an exemplary inner support clamp according to some embodiments of the present disclosure.

FIG. 3 is a schematic diagram illustrating a cross-section of an exemplary inner support clamp 300 according to some embodiments of the present disclosure.

As shown in FIG. 3, the inner support clamp 300 may include a first elastic component 2 and a supporting component 3.

When the first elastic component 2 is not inflated or deflated (i.e., the inner support clamp 300 has a negative air pressure), the first elastic component 2 may be in a loosen state or a contracted state. The first elastic component 2 may have a concaved shape along a vertical direction (i.e., a radial direction of the first elastic component 2). In some embodiments, the concaved shape may increase a surface area of the first elastic component 2 and improve an expansion range of the first elastic component 2 when the first elastic component 2 is expanded.

In some embodiments, the first elastic component 2 may have a conformal shape. A conformal shape refers to that the surface of the first elastic component 2 that fits well with a surface of an object to be clamped. For example, an outer surface (e.g., a texture of the outer surface) of the first elastic component 2 may be specially designed so that it fits with a surface (e.g., a texture of the surface) of the object. As another example, the shape of the first elastic component 2 may be the same (or substantially the same) as that of the object. For example, the shape of the first elastic component 2 may be the same as that of the object 410 as shown in FIG. 4. As yet another example, the surface of the first elastic component 2 may include one or more characteristics or textures, which may limit an expanding direction of the first elastic component 2 and improve the frictional force between the first elastic component 2 and the object. More descriptions regarding the characteristics or textures of the first elastic component 2 may be found elsewhere in the present disclosure. See, e.g., FIG. 15 and the relevant descriptions thereof.

In some embodiments, the first elastic component 2 may include an elastic material (e.g., a highly elastic material). The first elastic component 2 including the elastic material may be easily and quickly deformed under the force of air pressure, which may be suitable for industrial applications.

In some embodiments, the first elastic component 2 may include silica gel. Exemplary silica gel may include a hot vulcanization type solid organic silica gel, a fluorine silica gel, a liquid silica gel, etc. The silica gel may have a temperature stability in different temperatures, a wide hardness range (e.g., 10-80 Shore hardness), a chemical resistance, a relatively great sealing performance, a relatively great electrical property, a relatively great compression resistance performance, or the like, or any combination thereof. Compared with conventional organic elastic material, the silica gel may be more easily to be processed and/or manufactured. The silica gel may be molded, calendered, and/or extruded with relatively low energy consumption, thereby improving the production efficiency of the silica gel. A tensile strength refers to a force per unit which is used to stretch or pull a silica gel before breaking the silica gel. In some embodiments, the tensile strength of the hot vulcanization type solid organic silica gel may be 4.0 MPa~12.5 MPa. The tensile strength of the fluorine silica gel may be 8.7 MPa~12.1 MPa. The tensile strength of the liquid silica gel may be 3.6 MPa~11.0 MPa. An elongation may measure a maximum extension length of a material before the material is broke. For example, the elongation may be a ratio of the maximum extension length to an original length of the material. The elongation of the hot vulcanization type solid organic silica gel may be 90%~1120%. The elongation of the fluorine silica gel may be 159%~699%. The elongation of the liquid silica gel may be 220%~900%. The elongations of different silica gel are provided for illustration purpose and are not intended to be limiting. For example, different processing methods, curing agents, temperature, or the like, may change the elongation of a material.

Manufacturing the first elastic component 2 using silica gel may solve some problems of conventional inner support clamps. For example, as shown in FIG. 4, when the inner surface of the object 410 to be clamped has a relatively complex contour, the silica gel may be deformed to improve the fitting degree between the first elastic component 2 and the object 410. The first elastic component 2 may not need to be specially designed and the clamping efficiency of the inner support clamp may be improved.

The inner support clamp with the airbag disclosed in the present disclosure may be used for clamping various object (e.g., an object with a complex contour, a fragile object, an object with a thin wall, etc.), thereby improving the versatility of the inner support clamp, reducing the production cost of the inner support clamp, increasing the service life of the inner support clamp, or the like, or any combination thereof.

In some embodiments, the first elastic component 2 may include rubber, such as natural rubber, styrene-butadiene rubber, butadiene rubber, isoprene rubber, etc.

In some embodiments, the first elastic component 2 may include thermoplastic elastomer (TPE), elastic composite material, or the like, or any combination thereof. For example, the first elastic component 2 may include styrene-based thermoplastic elastomer (e.g., poly(styrene-butadiene-styrene) (SBS), styrene-ethylene-butylene-styrene (SEBS), styrene-ethylene-propylene-styrene (SEPS), ethylene propylene diene monomer (EPDM)/styrene, butadiene rubber (BR)/styrene, chlorobutyl rubber (CI-IIR)/styrene, 4-Nonylphenol (NP)/styrene, etc.), olefin-based thermoplastic elastomer (e.g., dynamically vulcanized thermoplastic polyolefin (TPO)), diene thermoplastic elastomer, etc. As another example, the first elastic component 2 may include polyolefin elastomer (POE), etc.

In some embodiments, a reinforcing component 9 may be disposed on an outer wall and/or an inner wall of the first elastic component 2 as shown in FIG. 1. In some embodiments, the reinforcing component 9 may include one or more reinforcing ribs disposed on the first elastic component 2.

The reinforcing rib(s) may include a stripe-shaped protrusion, a wave-shaped protrusion, a zigzag-shaped protrusion, or the like, or any combination thereof. As shown in FIG. 1, the reinforcing rib(s) may be disposed on an outer wall of the first elastic component 2, and have an annular protrusion structure that extends along a circumferential direction of the first elastic component 2, and protrudes along a radial direction of the first elastic component 2. As another example, the reinforcing rib(s) may be disposed on the outer wall of the first elastic component 2 in an axial direction and protrude outward in the radial direction. In some embodiments, the count of the reinforcing rib may be determined based on an actual need, for example, 1, 2, 3, 4, 5, 6, 7, 8, 9, 10, 11, 12, etc. In some embodiments, one or more reinforcing ribs may be evenly disposed on the outer wall of the first elastic component 2. In some embodiments, the one or more reinforcing ribs may be disposed on the outer surface of the first elastic component 2 in different manners as required.

The reinforcing rib(s) disposed on the outer wall of the first elastic component 2 may increase the friction coefficient of the outer wall of the first elastic component 2, and accordingly improve the friction force between the outer wall of the first elastic component 2 and an object to be clamped by the inner support clamp 100, thereby improving the clamping stability of the inner support clamp 100. In addition, the reinforcing rib(s) disposed on the outer wall of the first elastic component 2 may reinforce the first elastic component 2 (e.g., an airbag), thereby increasing the strength, the local stiffness, and the service life of the first elastic component 2. In some embodiments, when the first elastic component 2 is in an expanded state, the shape of the first elastic component 2 may be adjusted by adjusting a count, a size, an arrangement, etc., of the reinforcing rib(s).

Figure 15:
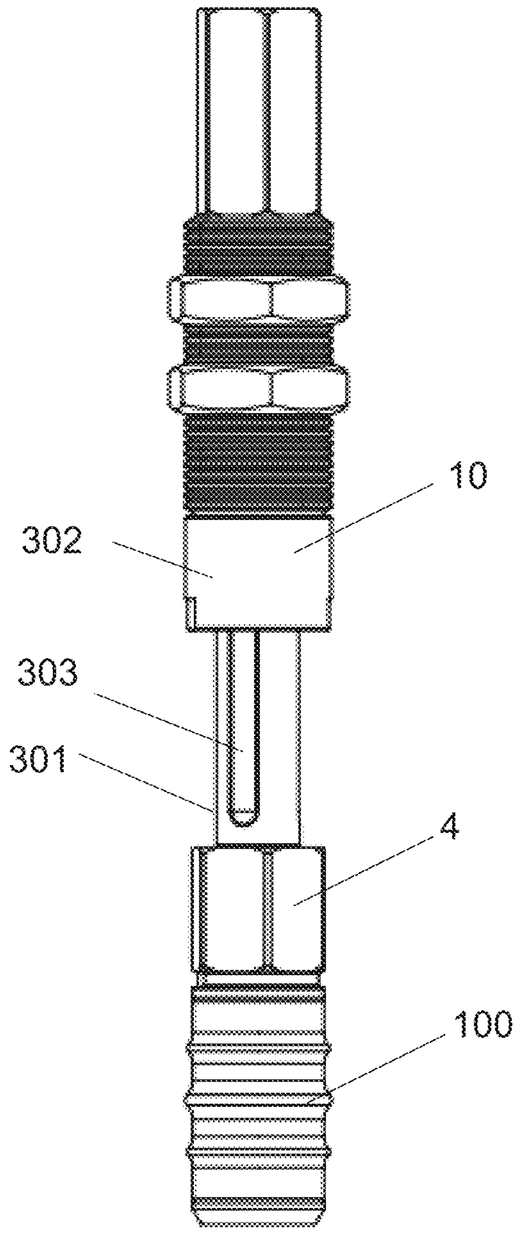
FIG. 15 is a schematic diagram illustrating an exemplary inner support clamp with a telescoping mechanism according to some embodiments of the present disclosure.

For example, one or more reinforcing ribs may be evenly disposed on the outer wall of the first elastic component 2, and the size of each of the one or more reinforcing ribs may be set relatively small so that when the first elastic component 2 is inflated, different portions of the first elastic component 2 may expand outward simultaneously or substantially simultaneously. As another example, a plurality of reinforcing ribs having a relatively large size and spaced apart from each other by a certain distance may be arranged, so that when the first elastic component 2 is inflated, a plurality of expansion portions (e.g., expansion portions as shown in FIG. 7 and FIG. 15) with different lengths and/or different diameters may be formed. Merely by way of example, when the first elastic component 2 is inflated, an expansion portion with a relatively small diameter may be formed on the top of the first elastic component 2, and an expansion portion with a relatively large diameter may be formed on the bottom of the first elastic component 2.

In some embodiments, a reinforcing component may be disposed on or formed by an inner wall of the first elastic component 2. The reinforcing component disposed on or formed by the inner wall of the first elastic component 2 may work together with the reinforcing component 9 disposed on the outer wall of the first elastic component 2, thereby improving the strength, the local stiffness, and/or the service life of the first elastic component 2, and adjusting the shape of the first elastic component 2 when the first elastic component 2 is in the expanded state.

In some embodiments, the reinforcing component 9 may include a rough surface of the first elastic component 2.

The rough surface may include at least one of a texture and/or a micro bump disposed on the first elastic component 2. For example, the rough surface may include a plurality of spherical crown-shaped protrusion and/or textures disposed on the outer wall of the first elastic component 2 in a uniform or non-uniform manner. In some embodiments, the rough surface may improve the friction coefficient of the outer wall of the first elastic component 2, and accordingly improve the friction force between the outer wall of the first elastic component 2 and an object to be clamped by the inner support clamp, thereby improving the clamping stability of the inner support clamp.

In some embodiments, the first elastic component 2 may include a wear layer, an anti-indentation layer, an oil-proof layer, an anti-static layer, or the like, or any combination thereof.

In some embodiments, other material may be disposed on the outer wall of the first elastic component 2, for example, in a coating manner, a soaking manner, etc. The material disposed on the outer wall of the first elastic component 2 may improve the wear resistance performance, the scratch-resistant performance, the oil resistance performance, the anti-static performance, and the like, of the first elastic component 2.

For example, a wear layer may be disposed on the outer wall of the first elastic component 2 by spraying a wear-resistant coating (e.g., KN17 polymer ceramic polymer coating, KN7051 silicon carbide ceramic coating, etc.) on the outer wall of the first elastic component 2. As another example, an oil-proof layer may be formed on the outer wall of the first elastic component 2 by soaking the first elastic component 2 into an oil-proof agent (e.g., a chromium complex of perfluoro carboxylic acid, a fluoro hydrocarbon acrylate resin, an organic fluorinated compound such as fluorocarbon sulfonyl ethyl acrylate, etc.). As still another example, an anti-static layer may be disposed on the outer wall of the first elastic component 2 by spraying an anti-static material (e.g., an anti-static carbon-based coating, an anti-static metal-based coating an anti-static metal oxide-based coating, an alkyd-type anti-static coating, an acrylic-type anti-static coating, an epoxy-type anti-static coating, a polyurethane-type anti-static coating, etc.) on the outer wall of the first elastic component 2 or soaking the first elastic component 2 into the anti-static material. As still another example, an anti-indentation layer may be disposed on the outer wall of the first elastic component 2 by spraying an anti-fingerprint coating agent on the outer wall of the first elastic component 2 or soaking the first elastic component 2 into the anti-fingerprint coating agent. Alternatively, a pressure-relief film may be disposed on the outer wall of the first elastic component 2 to form the anti-indentation layer.

In some embodiments, a connection part 32 may be disposed on the supporting component 3 and connected to an external device.

In some embodiments, the connection part 32 may include a thread connection part, an engagement connection part, or the like, or any combination thereof. In some embodiments, the supporting component 3 may be connected to the external device via the thread connection part in a thread connection manner, the engagement connection part in an engagement connection manner, or the like. In some embodiments, the supporting component 3 may be connected to the connection component 4 in a thread connection manner, an engagement connection manner, etc., and the connection component 4 may be connected to the external device, thereby establishing a connection between the supporting component 3 and the external device.

In some embodiments, an internal concave portion 33 may be disposed on a central part of the supporting component 3 as shown in FIGS. 1-3. A diameter of the central part of the supporting component 3 may be less than a diameter of each of the two ends of the supporting component 3. That is, a diameter of the supporting component 3 may be gradually increased from the central part to each of the two ends of the supporting component 3. In such cases, a chamber may be formed between the first elastic component 2 and the outer surface of the supporting component 3 when the first elastic component 2 is sleeved on the supporting component 3 to cover a portion of the supporting component 3. An airbag-like structure may be formed in the chamber formed between the first elastic component 2 and the outer surface of the supporting component 3. In some embodiments, after the inner support clamp clamps an object, it is likely that the first elastic component 2 may be unable to be separated from the object as required, for example, because of the electrostatic adsorption, etc. In such cases, an inflation and deflation device may be used to extract all or a portion of the gas between the first elastic component 2 and the internal concave portion 33 to contract the first elastic component 2 and separate the first elastic component 2 from the object.

In some embodiments, a first gas channel 1 may be disposed in the supporting component 3 as shown in FIGS. 1-3.

The chamber formed between the first elastic component 2 and the outer surface of the supporting component 3 may be connected to the inflation and deflation device through the first gas channel 1. For example, the inflation and deflation device may be connected to an airbag through the first gas channel 1.

Figure 5:
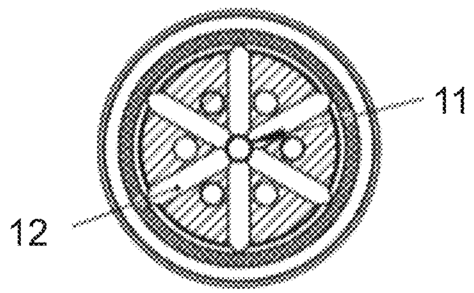
FIG. 5 is a schematic diagram illustrating gas channels of an exemplary inner support clamp according to some embodiments of the present disclosure.

In some embodiments, the first gas channel 1 may include a main gas channel and a plurality of branch gas channels. As shown in FIG. 5, the first gas channel 1 may include a main channel 11 and six branch gas channels 12. The chamber between the first elastic component 2 and the outer surface of the supporting component 3 or the airbag may be connected to the main gas channel through the plurality of branch gas channels. The main gas channel 11 may be connected to the inflation and deflation device. In some embodiments, the main gas channel 11 may be disposed in the supporting component 3, and one port of the main gas channel 11 may be connected to the inflation and deflation device. The plurality of branch gas channels 12 may be disposed between the main gas channel 11 and the chamber (or the airbag). A port of each of the plurality of branch gas channels 12 may be connected to the main gas channel 11 and the other port of each of the plurality of branch gas channels may be connected to the chamber. Using a plurality of ports of the plurality of branch gas channels may improve the efficiency of gas exchange between the inner support clamp and the inflation and deflation device.

In some embodiments, the inner support clamp may include a connection component 4. The connection component 4 may be configured to connect the inner support clamp to an external device.

Figure 10:
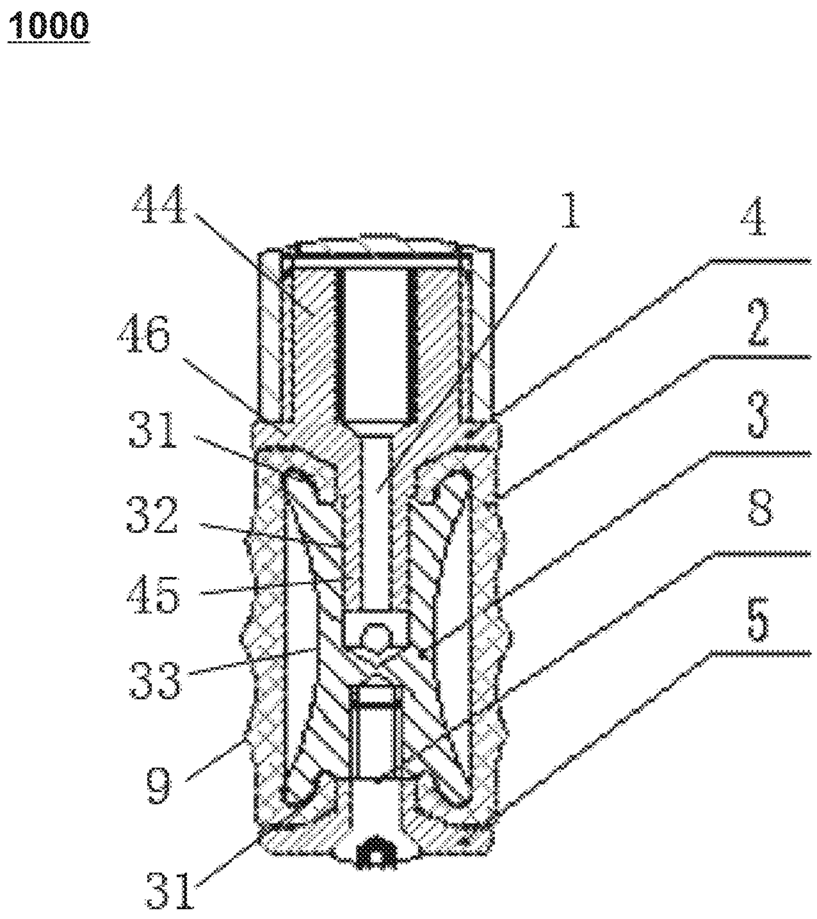
FIG. 10 is a schematic diagram illustrating an enlarged view of part I in FIG. 9 according to some embodiments of the present disclosure.

As shown in FIGS. 3, 7, and 10, the connection component 4 may be connected to the supporting component 3. The supporting component 3 and the first elastic component 2 may be connected to the external device through the connection component 4.

In some embodiments, the connection component 4 may include an upper connection unit 44 and a lower connection unit 45. The upper connecting unit 44 may be connected to an external device, and the lower connection unit 45 may be connected to the connection part 32 disposed on the supporting component 3.

FIG. 10 is a schematic diagram illustrating a cross-section of an inner support clamp 1000 according to some embodiments of the present disclosure.

As shown in FIG. 10, the connection component 4 may include an upper connection unit 44 and a lower connection unit 45. The upper connection unit 44 may include a threaded connection unit, an engagement connection unit, etc. The lower connection unit 45 may include a second thread connection unit, a second engagement connection unit, etc. When the inner support clamp 1000 is in a mounting state, the connection component 4 may be connected to a connection part 32 disposed on the supporting component 3 via a thread connection manner or an engagement connection manner through the lower connection unit 45, and the connection component 4 may be connected to the supporting component 3. In some embodiments, the connection component 4 may be detachably connected to the supporting component 3. When one or more components (e.g., a first elastic component 2, a supporting component 3, the connection component 4, etc.) of the inner support clamp 1000 are damaged, the damaged component(s) of the inner support clamp 1000 may be replaced without replacing other normal components, thereby saving the cost of using the inner support clamp 1000. In some embodiments, the connection component 4 may be non-detachably connected to the supporting component 3. For example, the connection component 4 and the supporting component 3 may be integrated formed, which may improve the stability of the inner support clamp 1000.

In some embodiments, the connection component 4 may be connected to an outer surface of the supporting component 3 along a vertical direction as shown in FIG. 10, which may increase a contact area between the first elastic component 2 and an inner side of an object to be clamped by the inner support clamp 1000, and make the inner support clamp 1000 easy to use. In some embodiments, the connection component 4 may be connected to a horizontal outer surface of the supporting component 3 through the first elastic component 2 as shown in FIG. 3 and FIG. 4. When an airbag is inflated, the airbag through which the connection component 4 passes may expand freely, and the airbag may be connected to an inner surface of the object.

In some embodiments, the connection component 4 may include a crimping unit 46 as shown in FIG. 10.

In some embodiments, the crimping unit 46 may include a protrusion portion disposed between the upper connection unit 44 and the lower connection unit 45. The crimping unit 46 may protrude outward along a radial direction of the inner support clamp 1000. As shown in FIG. 10, when the inner support clamp 1000 is in the mounting state, the crimping unit 46 may press the first elastic component 2 against the supporting component 3 to ensure the sealing between the first elastic component 2 and the supporting component 3. In some embodiments, a sealing ring, a sealing gasket, etc., may be disposed between the first elastic component 2 and a clamping part of the supporting component 3 to further ensure the sealing between the first elastic component 2 and the supporting component 3.

In some embodiments, a second gas channel may be disposed in the connection component 4.

The airbag and/or the chamber formed between the first elastic component 2 and the outer surface of the supporting component 3 may be connected to the inflation and deflation device through the second gas channel.

In some embodiments, when the inner support clamp 1000 is in the mounting state, the second gas channel may be connected to the first gas channel 1 disposed in the supporting component 3, and accordingly, the airbag or the chamber formed between the first elastic component 2 and the outer surface of the supporting component 3 may be connected to the inflation and deflation device.

In some embodiments, to improve the sealing of the inner support clamp 1000 and prevent the airbag from leaking and/or deforming, the inner support clamp 1000 may include a sealing component 5 as shown in FIGS. 1 and 10.

The sealing component 5 may include one or more static sealing components, one or more dynamic sealing components, or the like, or any combination thereof. The static sealing component(s) may include a gasket, a sealant, or other direct contact sealing components. The dynamic sealing component may include a rotatory sealing component, a reciprocating sealing component, or the like, or any combination thereof. According to whether the sealing component is in contact with a component that moves relative to the sealing component, the sealing component 5 may be classified as a contact type sealing component or a non-contact type sealing component. According to a contact position of the sealing component 5 and a component that moves relative to the sealing component 5, the sealing component 5 may be classified as a circumferential sealing component or an end face sealing component. The end face sealing component may be also referred to as a mechanical sealing component. Considering the complexity of assembly and disassembly of the sealing component, the sealing component 5 used in some embodiments of the present disclosure may be an end face sealing component. In some embodiments, a shape of the sealing component 5 may be determined based on the shape of an inner contact surface between the first elastic component 2 and the supporting component 3. The shape of the sealing component 5 may include a ring, a concave-convex shape, etc. An outer surface of the sealing component 5 may be hermetically connected to the inner contact surface between the first elastic component 2 and the supporting component 3. In some embodiments, the sealing component 5 may be disposed on outside of the first elastic component 2 and/or the supporting component 3. For example, the sealing component 5 may be hermetically connected to the outside of the first elastic component 2 and/or supporting component 3 using a gasket and/or a sealant.

In some embodiments, the sealing component 5 may include a sealing block 51. As shown in FIG. 3, an inner wall of the sealing block 51 may be hermetically connected to outer walls of the first elastic component 2 and the supporting component 3. In some embodiments, the sealing block 51 may include an upper sealing block and/or a lower sealing block. The upper sealing block may be disposed at a joint between an upper end of the first elastic component 2 and a top end of the supporting component 3, and the lower sealing block may be disposed at a joint between a lower end of the first elastic component 2 and a bottom end of the supporting component 3. Compared with other sealing components, the sealing component 5 may be easy to install or disassemble, and more suitable for industrial use. For example, as shown in FIG. 3, the sealing block 51 may be connected to the supporting component 3 via a fastening screw 8, and the inner wall of sealing block 51 may be hermetically connected with the outer walls of the first elastic component 2 and the supporting component 3.

Figure 12:
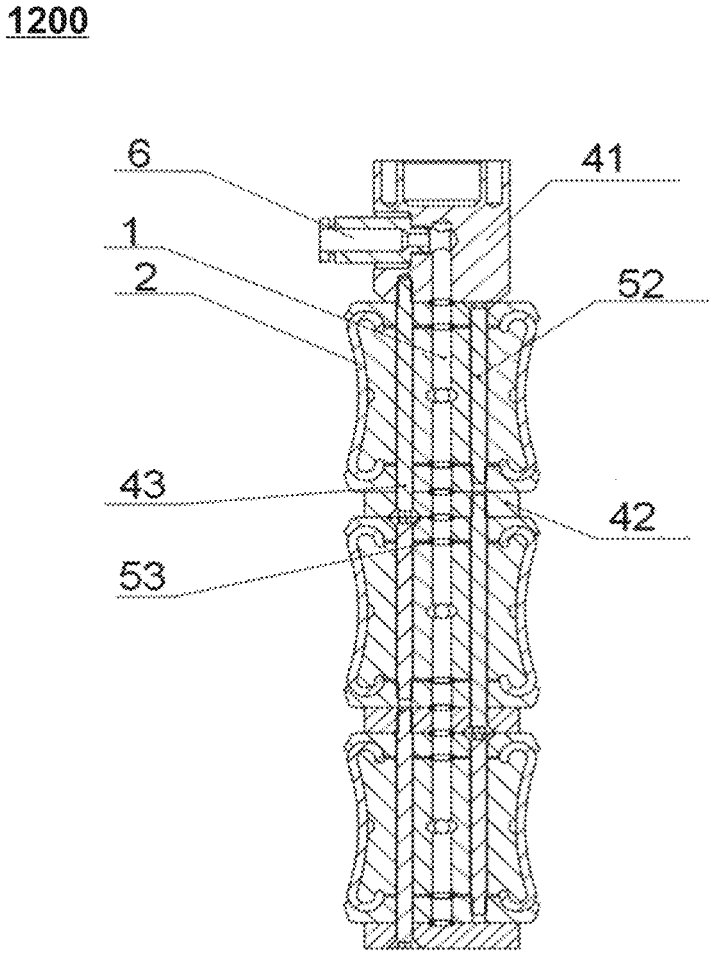
FIG. 12 is a schematic diagram illustrating a cross-section of an inner support clamp according to some embodiments of the present disclosure.

FIG. 12 is a schematic diagram illustrating a cross-section of an inner support clamp 1200 according to some embodiments of the present disclosure.

In some embodiments, as shown in FIG. 12, a sealing component (e.g., the sealing component 5) may further include a sub-sealing component 52. The sub-sealing component 52 may include a sealing screw. The sub-sealing component 52 may be configured to connect an upper sealing component and a lower sealing component of the inner support clamp 1200, and squeeze the upper sealing component and the lower sealing component toward an edge of a first elastic component 2, thereby achieving a physical connection between the upper sealing component and the lower sealing component and improving the gas tightness of the inner support clamp 1200. In some embodiments, the sub-sealing component 52 may be a screw with a relatively long length as shown in FIG. 12 or a screw with a relatively short length. The sub-sealing component 52 may further connect a sealing component (e.g., the sealing component 5) and a supporting component (e.g., the supporting component 3), and squeeze the sealing component and the supporting component toward the edge of the first elastic component 2, thereby achieving a physical connection between the sealing component and the supporting component and improving the gas tightness of the inner support clamp 1200. The implementation of the sub-sealing component 52 is not limited in the embodiments of the present disclosure.

In some embodiments, the inner support clamp 1200 may include a gas supplying interface 6.

The airbag or the chamber formed between the first elastic component 2 and an outer surface of the supporting component (e.g., the supporting component 3) may be connected to an inflation and deflation device through the gas supplying interface 6.

In some embodiments, the gas supplying interface 6 may be directly disposed on the first elastic component 2. One end of the gas supplying interface 6 may be connected to the inside of the first elastic component 2 and the other end of the gas supplying interface 6 may be connected to the inflation and deflation device, and accordingly, the inside of the first elastic component 2 may be connected to the inflation and deflation device. The first elastic component 2 may expand when the inflation and deflation device inflates gas into the first elastic component 2, and the first elastic component 2 may recover or contract when the gas in the first elastic component 2 is deflated or exhausted.

In some embodiments, the gas supplying interface 6 may be disposed on a connection component (e.g., the connection component 4) or the supporting component. As shown in FIG. 3, the gas channel disposed on the connection component 4 and/or the supporting component 3 may be connected to one end of the gas supplying interface 6, and the other end of the gas supplying interface 6 may be connected to the inflation and deflation device, and accordingly the first elastic component 2 may be connected to the inflation and deflation device. The first elastic component 2 may expand when the inflation and deflation device inflates a gas into the first elastic component 2, and the first elastic component 2 may recover and/or contract when the first elastic component 2 is deflated or exhausted.

In some embodiments, the inflation and deflation device may include an electric inflation and deflation device, a circulating inflation and deflation device, a gas extraction device, a gas generator, a gas storage device, etc.

A port of the gas supplying interface 6 may be connected to a port of the gas channel disposed on the connection component and/or the supporting component, and the other port of the gas supplying interface 6 may be connected to the inflation and deflation device. For example, a gas storage tank may be connected to the gas supplying interface 6 through a device or a joint (e.g., a solenoid valve) that may be used in a gas inflation and/or deflation. As another example, a gas generator may be connected to the gas supplying interface 6 through a device or a joint (e.g., the solenoid valve). In some embodiments, the gas generator may be disposed in the first elastic component 2. The pressure of the first elastic component 2 may be controlled and/or adjusted by a pneumatic system (e.g., the inflation and deflation device not shown in the figure), thereby improving the control accuracy of the expansion of the first elastic component 2.

In some embodiments, a plurality of inner support clamps described in the present disclosure may be used independently or in combination.

In some embodiments, a connection component (e.g., the connection component 4) of an inner support clamp may include a thread connection unit, an engagement connection unit, etc., and the connection component 4 may be connected to an external device via a thread connection manner, an engagement connection manner, etc. In some embodiments, the connection component may include an upper connection part and/or a lower connection part. For example, the inner support clamp may include one or both of the upper connection part and the lower connection part, which may be determined based on an actual need. The inner support clamp may be used independently or together with one or more other second inner support clamps.

Figure 11:
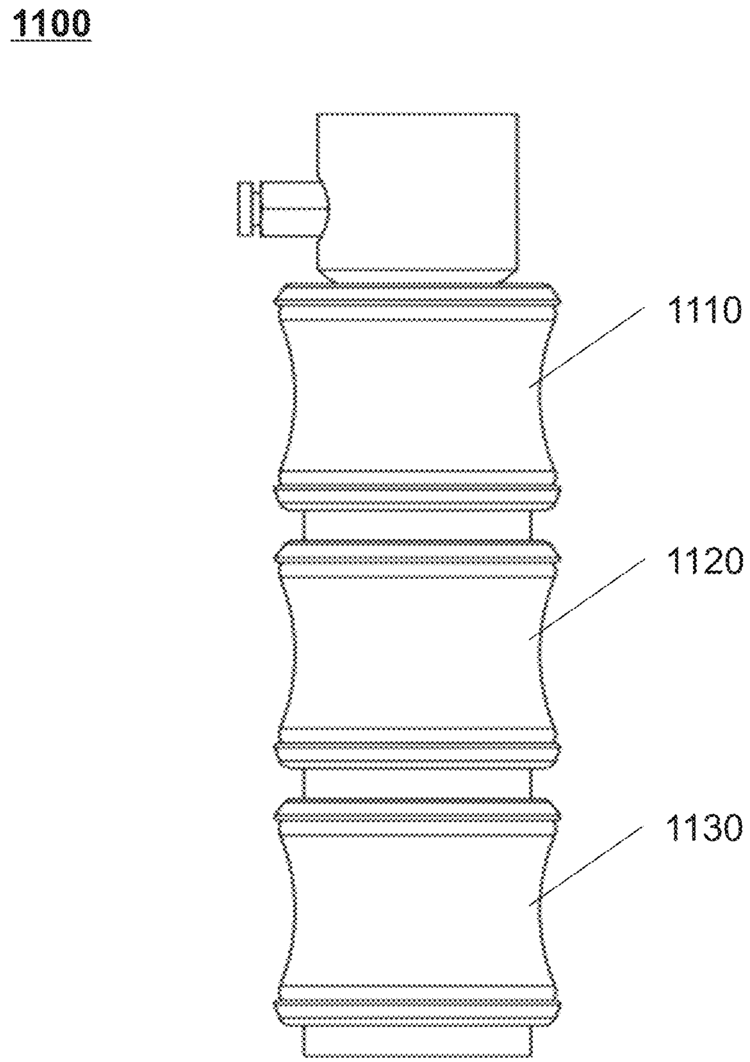
FIG. 11 is a schematic diagram illustrating an exemplary combined clamp including a plurality of inner support clamps according to some embodiments of the present disclosure.

FIG. 11 is a schematic diagram illustrating a combined clamp 1100 including a plurality of inner support clamps according to some embodiments of the present disclosure. FIG. 12 is a schematic diagram illustrating a cross-section of the combined clamp shown in FIG. 11.

As shown in FIG. 11 and FIG. 12, the plurality of inner support clamps (i.e., an inner support clamp 1110, an inner support clamp 1120, an inner support clamp 1130) may be combined in series via a connection component (e.g., the connection component 4 as described in connection with FIGS. 3, 4, 6-8, and 10). The combined clamp 1100 may be easily assembled and/or disassembled using the connection components, and the length of the combined clamp 1100 may be adjusted based on an actual need.

As shown in FIG. 12, the connection component may include a mounting unit 41 and a connection unit 42. The mounting unit 41 may be configured to connect the combined clamp 1200 with an external device. The connection unit 42 may be configured to connect two adjacent inner support clamps.

Optionally, the connection component may include a screw 43. In some embodiments, the screw 43 may include a screw with a relatively long length, which may be used to connect an inner support clamp to an adjacent inner support clamp or a mounting unit. In some embodiments, the screw 43 may include a screw with a relatively short length, which may be used to physically connect two supporting components (e.g., two supporting components 3 as described in connection with FIGS. 1-4, 7, and 10) of two adjacent inner support clamps.

Main gas channels of the plurality of inner support clamps may be connected to each other through the connection component(s). The pneumatic control of the plurality of inner support clamps may be performed by a gas supplying interface 6. Alternatively or additionally, a sealing component (e.g., a sealing ring 53) may be disposed at the joint between the main gas channel(s) and other components of the combined clamp 1200 to ensure the sealing of the combined clamp 1200.

In some embodiments, the first elastic component 2 may deform if the air pressure changes. For an inner support clamp, if the air pressures at different positions of the first elastic component 2 are the same, the pressure of the first elastic component 2 on an inner surface of an object to be clamped may be the same, the inner support clamp may cause damage to the object when the thickness of the object is variable along a vertical direction. The combined clamp 1200 may include a gas channel controller configured to control the connection of a plurality of gas channels of the plurality of inner support clamps. The gas channel controller (not shown in FIG. 11 and FIG. 12) may be disposed in the connection unit 42 shown in FIG. 12, thereby realizing an independent control of deflation or inflation of each of the plurality of inner support clamps. In some embodiments, the gas channel controller may include an air valve. In some embodiments, the plurality of the gas supplying interfaces 6 may be directly connected to each other via the connection component(s). In such cases, one or more gas channel controllers may be disposed between the plurality of gas supplying interfaces 6 and the inflation and deflation device. By controlling each of the one or more gas channel controllers, the deflation or inflation of a corresponding inner support clamp may be controlled.

Figure 13:
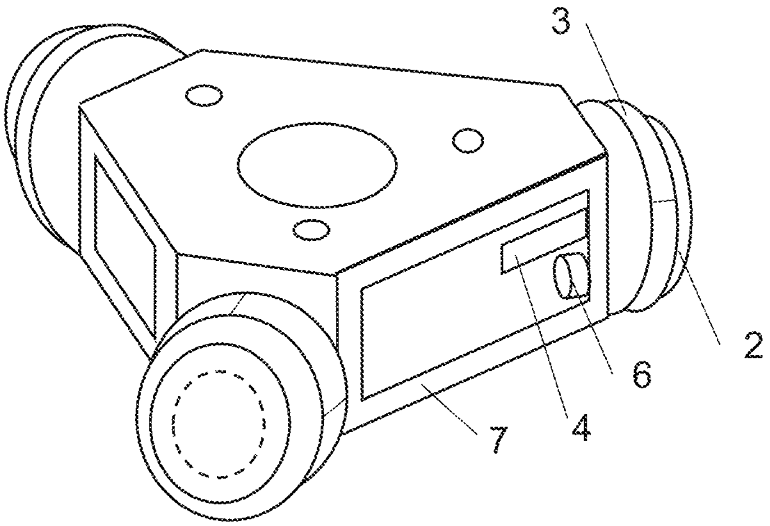
FIG. 13 is a schematic diagram illustrating an exemplary combined clamp in a deflated state according to some embodiments of the present disclosure.
Figure 14:
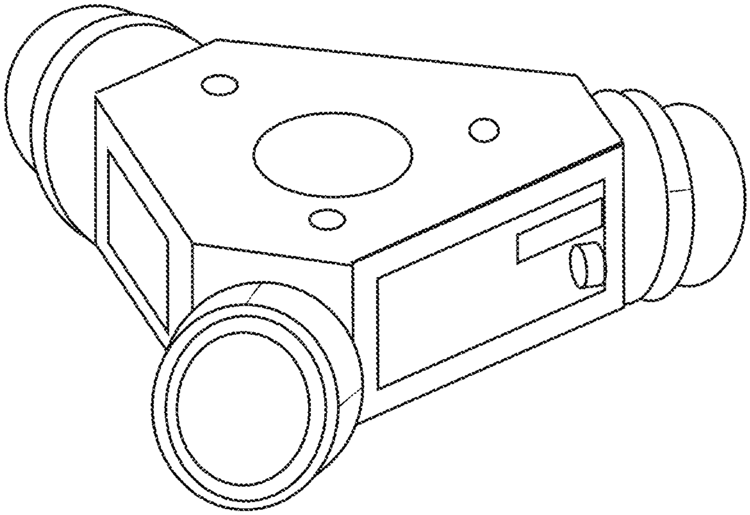
FIG. 14 is a schematic diagram illustrating the combined clamp shown in FIG. 13 in an expanded state according to some embodiments of the present disclosure.

FIG. 13 is a schematic diagram illustrating an exemplary combined clamp 1300 in a deflated state according to some embodiments of the present disclosure. FIG. 14 is a schematic diagram illustrating the combined clamp 1300 in an inflated state according to some embodiments of the present disclosure. In some embodiments, the combined clamp 1300 may be manufactured by combining a plurality of inner support clamps (e.g., the inner support clamps 100).

As shown in FIG. 13, the combined clamp 1300 may include a bracket 7. The bracket 7 may be connected to a connection component 4 and configured to establish a connection between each two adjacent inner support clamps of the combined clamp 1300. Compared with the combined clamp described in connection with FIG. 11 and/or FIG. 12, the combined clamp 1300 may be manufactured by arranging a plurality of inner support clamps in parallel. An airbag of each of the inner support clamp of the combined clamp 1300 may cover a portion of an outer surface of the supporting component 3 along a horizontal direction. The combined clamp 1300 may be manufactured by selecting and/or combining the bracket 7 and the plurality of inner support clamps according to an actual need. A plurality of contact points or contact surfaces may be formed between the combined clamp 1300 and an inner surface of the object to be clamped.

As shown in FIG. 13, three inner support clamps may be connected via the bracket 7, and three contact surfaces may be formed between the combined clamp 1300 and the object to be clamped. FIG. 13 illustrates a front view of the combined clamp 1300 when the combined clamp 1300 is contracted. FIG. 14 is a schematic diagram illustrating the combined clamp 1300 when each inner support clamp of the combined clamp 1300 as shown in FIG. 13 is in an expanded state. A combined clamp may be manufactured by combining a plurality of inner support clamps using a flexible bracket (e.g., the bracket 7). Such combined clamp may be easily designed and manufactured, and can be used to clamp an object with a large internal dimension. In some embodiments, the size of the bracket 7 may be adjusted. For example, the size of the bracket 7 may be adjusted by changing the length of a connection arm of the bracket 7.

In some embodiments, gas channels of the plurality of inner support clamps of a combined clamp may be connected. For example, the main gas channels of the plurality of inner support clamps may be directly connected. Alternatively, gas supplying interfaces of the plurality of inner support clamps may be directly connected. An inflation and deflation device may be used to deflate or inflate the plurality of inner support clamps. If the gas channels of the plurality of inner support clamps of a combined clamp are connected, the combined clamp may include a gas channel controller for controlling the connection of the gas channels of the plurality of inner support clamps. The gas channel controller may be disposed at joints of the gas channels of the plurality of inner support clamps, or joints of the gas supplying interfaces of the plurality of inner support clamps.

In some embodiments, a plurality of clamps of a combined clamp may be of the same type or different types. The combined clamp may include an inner support clamp, an external support clamp, or the like, or any combination thereof. For example, an inner support clamp may include a combined inner support clamp. As another example, the combined clamp may be formed by combining a plurality of combined inner support clamps, each of which includes a plurality of inner support clamps in series or a plurality of inner support clamps in parallel. The size of each of the first elastic component 2, the supporting component 3, the connection component 4, and the bracket 7 in some embodiments of the present disclosure may be determined according to the object to be clamped.

Figure 16:
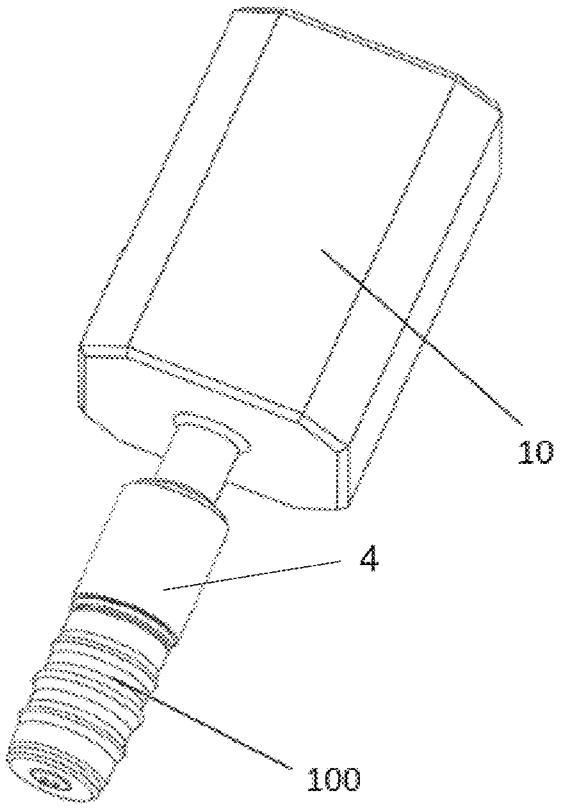
FIG. 16 is a schematic diagram illustrating an exemplary inner support clamp with a telescoping mechanism according to some embodiments of the present disclosure.

In some embodiments, an inner support clamp may also include a telescoping mechanism 10 as shown in FIGS. 15 and 16.

A supporting component (e.g., the supporting component 3 as described in connection with FIGS. 1-4, 7, and 10) of the inner support clamp may be connected to the telescoping mechanism 10 directly or through a connection component 4, etc. A first elastic component (e.g., the first elastic component 2) may move with the expansion and contraction of the telescoping mechanism 10. The connection component 4 may be connected to a telescoping end of the telescoping mechanism 10 through a thread connection unit, and the first elastic component may move with the expansion and/or contraction of the telescoping mechanism 10.

In some embodiments, the telescoping mechanism 10 may include a telescoping rod, for example, an electric telescoping rod, a hydraulic telescoping rod, a pneumatic telescoping rod, etc.

Figure 23:
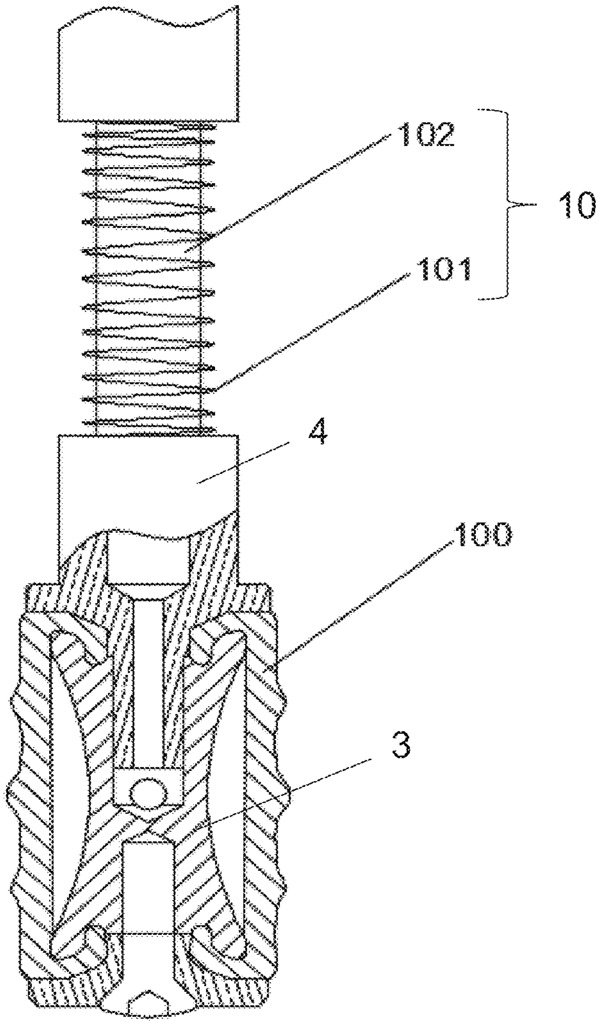
FIG. 23 is a schematic diagram illustrating an exemplary telescoping mechanism according to some embodiments of the present disclosure.

In some embodiments, the telescoping mechanism 10 may include a spring 101 and a traction unit 102 (e.g., a traction wire, a traction rope, a traction rod, etc.) as shown in FIG. 23. The supporting component 3 may be connected to the spring 101 and the traction unit 102 directly or through the connection component 4. The traction unit 102 may guide the supporting component 3 to move up and down, and the supporting component 3 may expand or contract with the expansion and contraction of the spring 101 under the traction of the traction unit 102.

In some embodiments, the connection component 4 may be part of the telescoping mechanism 10. For example, the connection component 4 may be a portion of the telescoping end of the telescoping mechanism 10. Merely by way of example, the connection component 4 may be a portion of the telescoping end of the telescoping rod.

The inner support clamp with the telescoping mechanism 10 may be used to clamp an object in a special scenario. For example, a plurality of objects to be clamped are densely stacked (e.g., densely packed bottle-shape objects), and heights of a part of the plurality of objects are lower than heights of surrounding objects, there may be insufficient space for clamping the plurality of object from outside of the plurality of objects. An inner support clamp may be unable to clamp an object the height of which is lower than the heights of its surrounding objects. An inner support clamp with the telescoping mechanism 10 may expand or contract, and the densely stacked objects may be clamped in batches.

Figure 17:
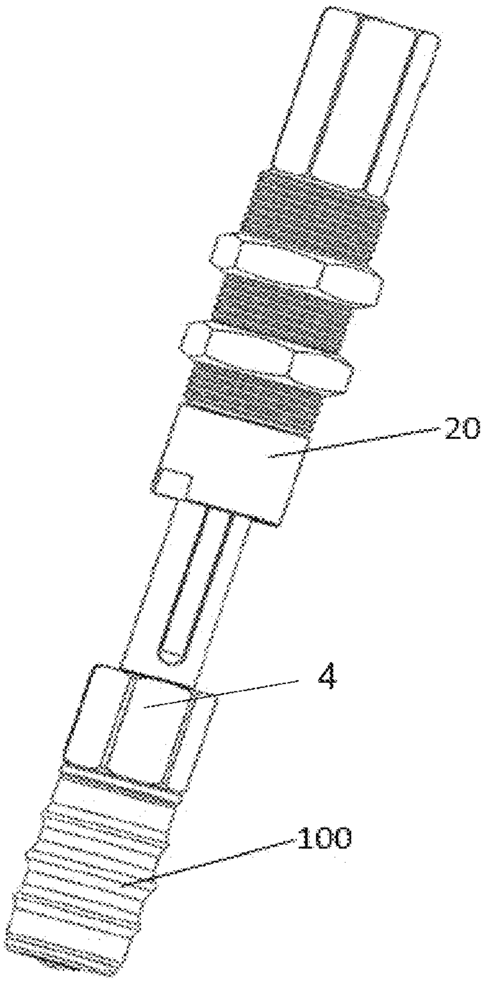
FIG. 17 is a schematic diagram illustrating an exemplary inner support clamp with a buffer component according to some embodiments of the present disclosure.

In some embodiments, the inner support clamp may include a buffer component 20 as shown in FIG. 17.

Figure 18:
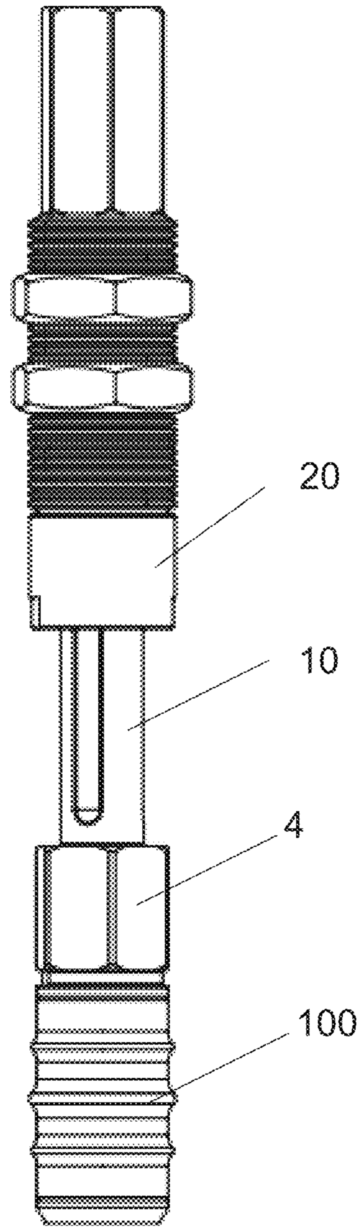
FIG. 18 is a schematic diagram illustrating an exemplary inner support clamp with a buffer component according to some embodiments of the present disclosure.

The supporting component 3 may be connected to the buffer component 20 directly or through the connection component 4, etc. For example, as shown in FIG. 17, the connection component 4 may be directly connected to the buffer component 20. Alternatively, the buffer component 20 may be connected to the connection component 4 through the telescoping mechanism 10. In some embodiments, the buffer component 20 may be integrally formed with the telescoping mechanism 10 as shown in FIG. 18. For example, an end of the telescoping mechanism 10 may be connected to the connection component 4, and the other end of the telescoping mechanism 10 may be connected to the buffer component 20.

When an external force is applied on the inner support clamp, the buffer component 20 may have a buffering function and configured to protect the inner support clamp and the object to be clamped. For example, when the inner support clamp extends into the object to be clamped, incorrect positioning of the inner support clamp may cause a collision between the first elastic component and the object to be clamped. In such cases, the buffer component 20 may implement the buffering function to protect the clamp and the object to be clamped.

In some embodiments, the buffer component 20 may include a buffer, a cushion, a buffer sheet, a buffer spring, or the like, or any combination thereof. In some embodiments, the buffer may include a buffer that may be adjusted automatically. When the first elastic component collides with the object to be clamped and a colliding force exceeds a preset threshold, the buffer may automatically expand or contract. In some embodiments, the buffer component 20 may include a telescoping mechanism, a pressure sensor, a controller, or the like, or any combination thereof. The telescoping mechanism and the pressure sensor may be connected to the controller. The supporting component may be connected to the telescoping mechanism. The pressure sensor may be disposed at a joint between the supporting component and the telescoping mechanism. The telescoping mechanism may include an electric telescoping rod, a hydraulic telescoping rod, a pneumatic telescoping rod, etc. When the first elastic component 2 collides with the object to be clamped and a colliding force exceeds the preset threshold, the telescoping mechanism may automatically expand and contract.

In some embodiments, the buffer component 20 may include a buffer piece, for example, a spring pad, a spring pad, a spring, etc.

In some cases (e.g., an inner support clamp clamps a plurality of objects in batches), if the inner support clamp does not accurately extend into the object to be clamped, it may cause damage to the object. The buffer component 20 (e.g., the spring, or other structures such as the telescoping rod, etc.) may cause a retraction of the inner support clamp. That is, the inner support clamp may be retracted when the inner support clamp touches the object, thereby reducing the damage to the object. In addition, when the inner support clamp clamps a plurality of objects in batches (e.g., clamping the objects according to a matrix), the inner support clamp may be unable to extend into one or more objects. Merely by way of example, the plurality of objects may include sixty objects. The inner support clamp may be able to extend into fifty-nine objects of the objects, but unable to extend into one of the objects. In such cases, fifty-nine objects may be moved by the inner support clamp and the remaining object may be not damaged.

In addition, the buffer component 20 may protect the first elastic component. Specifically, when the first elastic component extends into an object to be clamped, if the positioning of the first elastic component is not accurate or the depth the first elastic component within the object exceeds a threshold, the first elastic component may encounter a relatively large resistance. If the resistance is not buffered, a collapsing force may be generated, and accordingly, the friction of the first elastic component may be increased and the first elastic component may be damaged.

In some embodiments, an inner support clamp according to some embodiments may include a gas channel, an airbag, a supporting component 3, a connection component 4, a sealing component 5, a gas supplying interface 6, a bracket 7, and a telescoping mechanism 10.

The airbag may cover at least a portion of an outer surface of the supporting component 3, and a chamber may be formed between the airbag and the supporting component 3. At least one port of the gas channel may be connected to the chamber through the supporting component 3. The connection component 4 may be connected to the supporting component 3, thereby connecting the inner support clamp and an external device. The gas channel may include a first gas channel 1 disposed in the supporting component 3 and a second gas channel disposed in the connection component 4.

The first elastic component 2 may include an airbag, which may include silica gel. Conventionally, an airbag of an inner support clamp may include rubber. The elasticity of the rubber may be relatively poor. In order to deform the airbag to fit a surface of an object to be clamped, a cylinder principle may be utilized. That is, a gas may be inflated into a sealed chamber of the airbag, and air pressure in the chamber may be several times (e.g., tenfold) higher than the atmospheric pressure outside the chamber. The pressure difference may be generated when the cross-sectional area of a piston rod of the cylinder is smaller than the cross-sectional area of a piston of the cylinder, which may drive a movement of the piston rod. The movement of the piston rod may squeeze the airbag to move the entire inner support clamp in a vertical direction, which may further cause a deformation of the airbag in a horizontal direction. In such cases, the deformation rate of the airbag may be relatively slow, and the deformability degree may be relatively low. The inner support clamp with the airbag made of rubber may be not suitable for clamping an object with a relatively complex internal contour and/or a thin inner wall. According to some embodiments of the present disclosure, the airbag may include silica gel, the technical problems faced by conventional inner support clamps describe above may be effectively solved. For example, as shown in FIG. 4, when the inner surface of the object 410 includes a complex contour, the airbag including silica gel may be easily deformed to fit the inner surface of the object 410. In such cases, the inner support clamp may not need to be designed in advance. The inner support clamp based on the airbag with high elasticity may be applied to clamp an object with a complex inner contour, and the inner support clamp may have relatively strong versatility, a high clamping efficiency, and be suitable for multiple industrial scenarios and daily life scenarios, etc.

The sealing component 5 may include one or more static sealing components, one or more dynamic sealing components, or the like, or any combination thereof. The static sealing component(s) may include a gasket, a sealant, or other direct contact sealing components. The dynamic sealing component may include a rotatory sealing component, a reciprocating sealing component, or the like, or any combination thereof. According to whether the sealing component is in contact with a component that moves relative to the sealing component, the sealing component 5 may be classified as a contact type sealing component or a non-contact type sealing component. According to a contact position of the sealing component 5 and a component that moves relative to the sealing component 5, the sealing component 5 may be classified as a circumferential sealing component or an end face sealing component. The end face sealing component may be also referred to as a mechanical sealing component. Considering the complexity of assembly and disassembly of the sealing component, the sealing component 5 used in some embodiments of the present disclosure may be an end face sealing component. In some embodiments, a shape of the sealing component 5 may be determined based on the shape of an inner contact surface between the first elastic component 2 and the supporting component 3. The shape of the sealing component 5 may include a ring, a concave-convex shape, etc. An outer surface of the sealing component 5 may be hermetically connected to the inner contact surface between the first elastic component 2 and the supporting component 3. In some embodiments, the sealing component 5 may be disposed on outside of the first elastic component 2 and/or the supporting component 3. For example, the sealing component 5 may be hermetically connected to the outside of the first elastic component 2 and/or supporting component 3 using a gasket and/or a sealant. In some embodiments, the sealing component 5 may include a sealing block 51. As shown in FIG. 3, an inner wall of the sealing block 51 may be hermetically connected to outer walls of the first elastic component 2 and the supporting component 3. In some embodiments, the sealing block 51 may include an upper sealing block and/or a lower sealing block. The upper sealing block may be disposed at a joint between an upper end of the first elastic component 2 and a top end of the supporting component 3, and the lower sealing block may be disposed at a joint between a lower end of the first elastic component 2 and a bottom end of the supporting component 3. Compared with other sealing components, the sealing component 5 may be easy to install or disassemble, and more suitable for industrial use. For example, as shown in FIG. 3, the sealing block 51 may be connected to the supporting component 3 via a fastening screw 8, and the inner wall of sealing block 51 may be hermetically connected with the outer walls of the first elastic component 2 and the supporting component 3. In some embodiments, as shown in FIG. 12, a sealing component (e.g., the sealing component 5) may further include a sub-sealing component 52. The sub-sealing component 52 may include a sealing screw. The sub-sealing component 52 may be configured to connect an upper sealing component and a lower sealing component of the inner support clamp 1200, and squeeze the upper sealing component and the lower sealing component toward an edge of a first elastic component 2, thereby achieving a physical connection between the upper sealing component and the lower sealing component and improving the gas tightness of the inner support clamp 1200. In some embodiments, the sub-sealing component 52 may be a screw with a relatively long length as shown in FIG. 12 or a screw with a relatively short length. The sub-sealing component 52 may further connect the sealing component and the supporting component 3, and squeeze the sealing component and the supporting component 3 toward the edge of the first elastic component 2, thereby achieving a physical connection between the sealing component and the supporting component 3 and improving the gas tightness of the inner support clamp 1200.

In some embodiments, a waist of the airbag may be concaved. As shown in FIG. 3, when the airbag is not inflated or deflated (i.e., the inner support clamp 300 is in a negative air pressure), the airbag may be in a loosen state or a contracted state. The airbag may have a concaved shape along a vertical direction (i.e., a radial direction of the first elastic component 2). In some embodiments, the concaved shape may increase a surface area of the airbag and improve an expansion range of the airbag when the airbag is expanded.

In some embodiments, the airbag may have a conformal shape. A conformal shape refers to that the surface of the airbag that fits well with a surface of an object to be clamped. For example, an outer surface (e.g., a texture of the outer surface) of the airbag may be specially designed so that it fits with a surface (e.g., a texture of the surface) of the object. As another example, the shape of the airbag may be the same (or substantially the same) as that of the object. For example, the shape of the airbag may be the same as that of the object 410 as shown in FIG. 4. As yet another example, the surface of the airbag may include one or more characteristics or textures, which may limit an expanding direction of the airbag and improve the frictional force between the airbag and the object. More descriptions regarding the characteristics or textures of the airbag may be found elsewhere in the present disclosure. See, e.g., FIG. 15 and the relevant descriptions thereof.

A port of the gas supplying interface 6 may be connected to a port of the gas channel disposed on the connection component 4 and/or the supporting component 3, and the other port of the gas supplying interface 6 may be connected to the inflation and deflation device. The pressure of the airbag may be controlled and/or adjusted by a pneumatic system (e.g., the inflation and deflation device not shown in the figure), thereby improving the control accuracy of the expansion of the airbag. In some embodiments, the gas channel 1 may include a main gas channel 11 and a plurality of branch gas channels 12. In some embodiments, the main gas channel 11 may be disposed in the supporting component 3, and one port of the main gas channel 11 may be connected to the inflation and deflation device. The plurality of branch gas channels 12 may be disposed between the main gas channel 11 and the chamber (or the airbag). A port of each of the plurality of branch gas channels 12 may be connected to the main gas channel 11 and the other port of each of the plurality of branch gas channels may be connected to the chamber. As shown in FIG. 5, the first gas channel 1 may include a main channel 11 and six branch gas channels 12. Using a plurality of ports of the plurality of branch gas channels may improve the efficiency of gas exchange between the inner support clamp and the inflation and deflation device.

The airbag may be hermetically disposed on the supporting component 3 and cover the entire of the outer surface of the supporting component 3. For example, as shown in FIG. 1, the clamping part 31 may be disposed on each of a first end (also referred to as a top end) and a second end (also referred to as a bottom end) of the supporting component 3. When the inner support clamp 100 is in the mounting state, the airbag may be disposed on the supporting component 3. The upper end of the airbag may be mounted on the clamping part 31 that is disposed on the first end of the supporting component 3. The lower end of the airbag may be mounted on the clamping part 31 that is disposed on the second end of the supporting component 3. The upper end and/or the lower end of the airbag may be hermetically connected to the clamping part(s) 31 via various sealing modes, such as an adhesive sealing mode, a pressure sealing mode, an engagement sealing mode, a sealing mode using a sealing element, etc. In some embodiments, the airbag may be sleeved on the supporting component 3, cover the entire of the outer surface of the supporting component 3, and hermetically connected to the supporting component 3. The airbag may cover the outer surface of the supporting component 3. When the inner support clamp 100 is inflated (i.e., the inner support clamp 100 is in a positive air pressure state), the inner support clamp 100 may have the shape of a lantern, an ellipsoid, a drum, etc. The airbag may contact with an inner surface of an object along the circumference of the airbag to clamp the object. In some embodiments, the connection component 4 may be connected to a surface of the supporting component 3 through the airbag. When an airbag is inflated, the airbag through which the connection component 4 passes may expand freely, and the airbag may be connected to an inner surface of the object. In some embodiments, the connection component 4 may be connected to an outer surface of the supporting component 3 along a vertical direction, which may increase a contact area between the first elastic component 2 and an inner side of an object to be clamped by the inner support clamp, and make the inner support clamp easy to use. As shown in FIGS. 6-7, the connection component 4 may include an upper connection part and/or a lower connection part. For example, the inner support clamp may include one or both of the upper connection part and the lower connection part, which may be determined based on an actual need. The inner support clamp may be used independently or together with one or more other second inner support clamps. As shown in FIG. 11, the plurality of inner support clamps (i.e., an inner support clamp 1110, an inner support clamp 1120, and an inner support clamp 1130) may be combined in series via a connection component (e.g., the connection component). The combined clamp 1100 may be easily assembled and/or disassembled using the connection components, and the length of the combined clamp 1100 may be adjusted based on an actual need. The connection component may include a mounting unit 41 and a connection unit 42 as shown in FIG. 12. The mounting unit 41 may be configured to connect the combined clamp 1200 with an external device. The connection unit 42 may be configured to connect two adjacent inner support clamps. Alternatively, the connection component may include a screw 43. Optionally, the connection component may include a screw 43. As shown in FIG. 12, the screw 43 may include a screw with a relatively long length, which may be used to connect an inner support clamp to an adjacent inner support clamp or a mounting unit. In some embodiments, the screw 43 may include a screw with a relatively short length, which may be used to physically connect two supporting components 3 of two adjacent inner support clamps. Main gas channels of the plurality of inner support clamps may be connected to each other through the connection component(s). The pneumatic control of the plurality of inner support clamps may be performed by a gas supplying interface 6. Alternatively or additionally, a sealing component 5 (e.g., a sealing ring 53) may be disposed at the joint between the main gas channel(s) and other components of the combined clamp 1200 to ensure the sealing of the combined clamp 1200. In some embodiments, the airbag may deform if the air pressure changes. For an inner support clamp, if the air pressures at different positions of the airbag are the same, the pressure of the airbag on an inner surface of an object to be clamped may be the same, the inner support clamp may cause damage to the object to be clamped when the thickness of the object to be clamped is variable along a vertical direction. The combined clamp 1200 may include a gas channel controller configured to control the connection of a plurality of gas channels of the plurality of inner support clamps. The gas channel controller (not shown in FIG. 11 and FIG. 12) may be disposed in the connection unit 42 shown in FIG. 12, thereby realizing an independent control of deflation or inflation of each of the plurality of inner support clamps. In some embodiments, the gas channel controller may include an air valve. In some embodiments, the plurality of the gas supplying interfaces 6 may be directly connected to each other via the connection component. In such cases, one or more gas channel controllers may be disposed between the plurality of gas supplying interfaces 6 and the inflation and deflation device. By controlling each of the one or more gas channel controllers, the deflation or inflation of a corresponding inner support clamp may be controlled.

A combined clamp may include a bracket 7 as shown in FIG. 13. The bracket 7 may be connected to the connection component and configured to establish a connection between each two inner support clamps. Compared with the combined clamp described in connection with FIG. 11 and/or FIG. 12, the combined clamp may be manufactured by arranging a plurality of inner support clamps in parallel. An airbag of each of the inner support clamp of the combined clamp may cover a portion of an outer surface of the supporting component 3 along a horizontal direction. The combined clamp may be manufactured by selecting and/or combining the bracket 7 and the plurality of inner support clamps according to an actual need. A plurality of contact points or contact surfaces may be formed between the combined clamp and an inner surface of the object to be clamped. As shown in FIG. 13, three inner support clamps may be connected via the bracket 7, and three contact surfaces may be formed between the combined clamp 1300 and the object to be clamped. A combined clamp may be manufactured by combining a plurality of inner support clamps using a flexible bracket (e.g., the bracket 7). Such combined clamp may be easily designed and manufactured, and can be used to clamp an object with a large internal dimension. In some embodiments, the size of the bracket 7 may be adjusted. For example, the size of the bracket 7 may be adjusted by changing the length of a connection arm of the bracket 7.

In some embodiments, gas channels of the plurality of inner support clamps of a combined clamp may be connected. For example, the main gas channels of the plurality of inner support clamps may be directly connected. Alternatively, gas supplying interfaces of the plurality of inner support clamps may be directly connected. An inflation and deflation device may be used to deflate or inflate the plurality of inner support clamps. If the gas channels of the plurality of inner support clamps of a combined clamp are connected, the combined clamp may include a gas channel controller for controlling the connection of the gas channels of the plurality of inner support clamps. The gas channel controller may be disposed at joints of the gas channels of the plurality of inner support clamps, or joints of the gas supplying interfaces of the plurality of inner support clamps.

In some embodiments, a plurality of clamps of a combined clamp may be of the same type or different types. The combined clamp may include an inner support clamp, an external support clamp, or the like, or any combination thereof. For example, an inner support clamp may include a combined inner support clamp. As another example, the combined clamp may be formed by combining a plurality of combined inner support clamps, each of which includes a plurality of inner support clamps in series or a plurality of inner support clamps in parallel.

The size of each of the first elastic component 2, the supporting component 3, the connection component 4, and the bracket 7 in some embodiments of the present disclosure may be determined according to the object to be clamped.

In some embodiments, one or more reinforcing ribs may be disposed on an outer wall of the airbag. The reinforcing rib(s) may include an annular protrusion which may be arranged along a circumferential direction of the airbag to form a reinforcing component 9 as shown in FIG. 1, FIG. 2, FIG. 8, and FIG. 10. The reinforcing rib(s) disposed on the outer wall of the airbag may increase the friction coefficient of the outer wall of the airbag, and accordingly improve the friction force between the outer wall of the airbag and an object to be clamped by the inner support clamp 100, thereby improving the clamping stability of the inner support clamp 100. In addition, the reinforcing rib(s) disposed on the outer wall of the airbag may reinforce the airbag, thereby increasing the strength, the local stiffness, and the service life of the airbag. In some embodiments, when the airbag is in an expanded state, the shape of the airbag may be adjusted by adjusting a count, a size, an arrangement, etc., of the reinforcing rib(s).

In some embodiments, the airbag may include a wear layer, an anti-indentation layer, an oil-proof layer, an anti-static layer, or the like, or any combination thereof.

In some embodiments, the supporting component 3 may be connected to the external device via the thread connection part in a thread connection manner, the engagement connection part in an engagement connection manner, or the like. In some embodiments, an internal concave portion 33 may be disposed on a central part of the supporting component 3 as shown in FIGS. 1-3.

As shown in FIG. 10, the connection component 4 may include an upper connection unit 44 and a lower connection unit 45. The upper connection unit 44 may include a threaded connection unit, an engagement connection unit, etc. The lower connection unit 45 may include a second thread connection unit, a second engagement connection unit, etc. When the inner support clamp 1000 is in a mounting state, the connection component 4 may be connected to a connection part 32 disposed on the supporting component 3 via a thread connection manner or an engagement connection manner through the lower connection unit 45.

In some embodiments, the connection component 4 may include a crimping unit 46. In some embodiments, the crimping unit 46 may include a protrusion portion disposed between the upper connection unit 44 and the lower connection unit 45. The crimping unit 46 may protrude outward along a radial direction of the inner support clamp 1000. As shown in FIG. 10, when the inner support clamp 1000 is in the mounting state, the crimping unit 46 may press the first elastic component 2 against the supporting component 3 to ensure the sealing between the first elastic component 2 and the supporting component 3.

In some embodiments, an inner support clamp may also include a telescoping mechanism 10 as shown in FIGS. 15 and 16. A supporting component (e.g., the supporting component 3 as described in connection with FIGS. 1-4, 7, and 10) of the inner support clamp may be connected to the telescoping mechanism 10 directly or through a connection component 4, etc. An airbag may move with the expansion and contraction of the telescoping mechanism 10. The connection component 4 may be connected to a telescoping end of the telescoping mechanism 10 through a thread connection unit. A first elastic component (e.g., the first elastic component 2) may move with the expansion and/or contraction of the telescoping mechanism 10. The connection component 4 may be connected to a telescoping end of the telescoping mechanism 10 through a thread connection unit, and the first elastic component may move with the expansion and/or contraction of the telescoping mechanism 10. In some embodiments, the telescoping mechanism 10 may include a telescoping rod, for example, an electric telescoping rod, a hydraulic telescoping rod, a pneumatic telescoping rod, etc. The inner support clamp with the telescoping mechanism 10 may be used to clamp an object in a special scenario. For example, a plurality of objects to be clamped are densely stacked (e.g., densely packed bottle-shape objects), and heights of a part of the plurality of objects are lower than heights of surrounding objects, there may be insufficient space for clamping the plurality of object from outside of the plurality of objects. An inner support clamp may be unable to clamp an object the height of which is lower than the heights of its surrounding objects. An inner support clamp with the telescoping mechanism 10 may expand or contract, and the densely stacked objects may be clamped in batches.

In some embodiments, the inner support clamp may include a buffer component 20 as shown in FIG. 17. The supporting component may be connected to the buffer component 20 directly or through the connection component 4. For example, as shown in FIG. 17, the connection component 4 may be directly connected to the buffer component 20. When an external force is applied on the inner support clamp, the buffer component 20 may have a buffering function and configured to protect the inner support clamp and the object to be clamped. For example, when the inner support clamp extends into the object to be clamped, incorrect positioning of the inner support clamp may cause a collision between the first elastic component and the object to be clamped. In such cases, the buffer component 20 may implement the buffering function to protect the clamp and the object to be clamped. In some embodiments, the buffer component 20 may include a buffer, a cushion, a buffer sheet, a buffer spring, or the like, or any combination thereof. In some cases (e.g., an inner support clamp clamps a plurality of objects in batches), if the inner support clamp does not accurately extend into the object to be clamped, it may cause damage to the object. The buffer component 20 (e.g., the spring, or other structures such as the telescoping rod, etc.) may cause a retraction of the inner support clamp. That is, the inner support clamp may be retracted when the inner support clamp touches the object, thereby reducing the damage to the object. In addition, when the inner support clamp clamps a plurality of objects in batches (e.g., clamping the objects according to a matrix), the inner support clamp may be unable to extend into one or more objects. Merely by way of example, the plurality of objects may include sixty objects. The inner support clamp may be able to extend into fifty-nine objects of the objects, but unable to extend into one of the objects. In such cases, fifty-nine objects may be moved by the inner support clamp and the remaining object may be not damaged. In addition, the buffer component 20 may protect the airbag. Specifically, when the airbag extends into an object to be clamped, if the positioning of airbag is not accurate or the depth the airbag within the object exceeds a threshold, the airbag may encounter a relatively large resistance. If the resistance is not buffered, a collapsing force may be generated, and accordingly, the friction of the airbag may be increased and the airbag may be damaged.

In some embodiments, an inner support clamp may include the telescoping mechanism 10 and the buffer component 20. The buffer component 20 may be connected to the connection component 4 through the telescoping mechanism 10 as shown in FIG. 18. For example, an end of the telescoping mechanism 10 may be connected to the connection component 4, and the other end of the telescoping mechanism 10 may be connected to the buffer component 20. In some embodiments, the buffer component 20 may be integrally formed with the telescoping mechanism 10.

In some embodiments, one or more of the bracket 7, the reinforcing component 9, the telescoping mechanism 10, and/or the buffer component 20 may be omitted according to actual manufacture and/or use need.

In some embodiments, a clamp may include the inner support clamp 100 and an external clamp. In some embodiments, the external clamp may include a flexible gripper. The flexible gripper may be coaxial with the inner support clamp 100. The flexible gripper and the inner support clamp 100 may be movable relative to each other. The flexible gripper may clamp an object to be clamped when the clamp is in use. In some embodiments, the external clamp may include a ring-shaped airbag clamp, a hydraulic gripper, a pneumatic gripper, an electric gripper, etc. The external clamp may be configured to clamp the object 410 together with the inner support clamp 100.

By using the external clamp, the inner surface and the outer surface of the object may be clamped simultaneously. Even one of the inner support clamp and the external clamp fails to clamp the object or slips from the object, the other one may clamp the object. In addition, the distribution of a clamping force may be uniform when the object is clamped from the inner surface and the outer surface of the object, thereby avoiding a damage to the object caused by an excessive local force. In some embodiments, the clamp with the external clamp may be applied for some special scenarios. For example, for an object that is difficult to be directly clamped by an external clamp, the inner support clamp 100 may slightly lift the object, and the external clamp may clamp the lifted object. As another example, for bottle-shape objects that are densely packed, there may be insufficient space for an external clamp to clamp the bottle-shape objects, and an inner support clamp 100 may be unable to clamp the bottle-shape objects with a relatively high speed. The external clamp may clamp the bottle-shape objects together with the inner support clamp 100. For example, the inner support clamp 100 may be extended into a bottle-shape object to be clamped and lift the bottle-shape object to a certain height, and the external clamp may clamp the object.

In some embodiments, a clamp may include the inner support clamp 100 as described above and a guiding device 30 as shown in FIG. 21.

Figure 21:
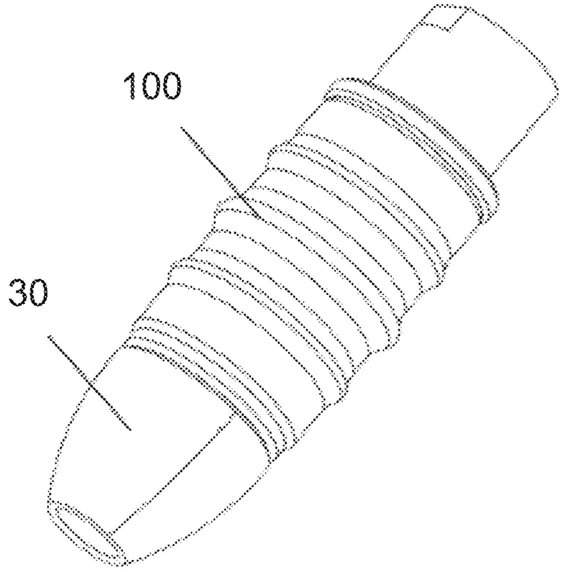
FIG. 21 is a schematic diagram illustrating an exemplary guiding device according to some embodiments of the present disclosure.

In some embodiments, the guiding device 30 may be detachably disposed on the inner support clamp 100. In some embodiments, the guiding device 30 may have a shape of a taper, a trumpet, etc. The guiding device 30 may be detachably disposed at an extending end of the inner support clamp 100 via a thread connection, an engagement connection, etc. For example, as shown in FIG. 21, the guiding device 30 may have the shape of a bullet, which may be detachably disposed at a front end of the inner support clamp 100 via the thread connection, the engagement connection, or the like, or any combination thereof. When the clamp is extended into the object or sleeved the object, the clamp may not accurately clamp the object and/or cause damage to the object if the clamp does not align with the object. The guiding device 30 may act as a bullet head or a trumpet mouth, which may improve the alignment accuracy and fault tolerance of the clamp. In some embodiments, the guiding device 30 may include an elastic material, a flexible material, etc. such as silica gel, rubber, etc. In some embodiments, the guiding device 30 may include a hollow structure or a solid structure. In some embodiments, the guiding device 30 may include a smooth surface, which may reduce a friction force between the surface of the guiding device 30 and the object, and avoid a damage to the object, and make it easy to insert the inner support clamp into the object.

Figure 19:
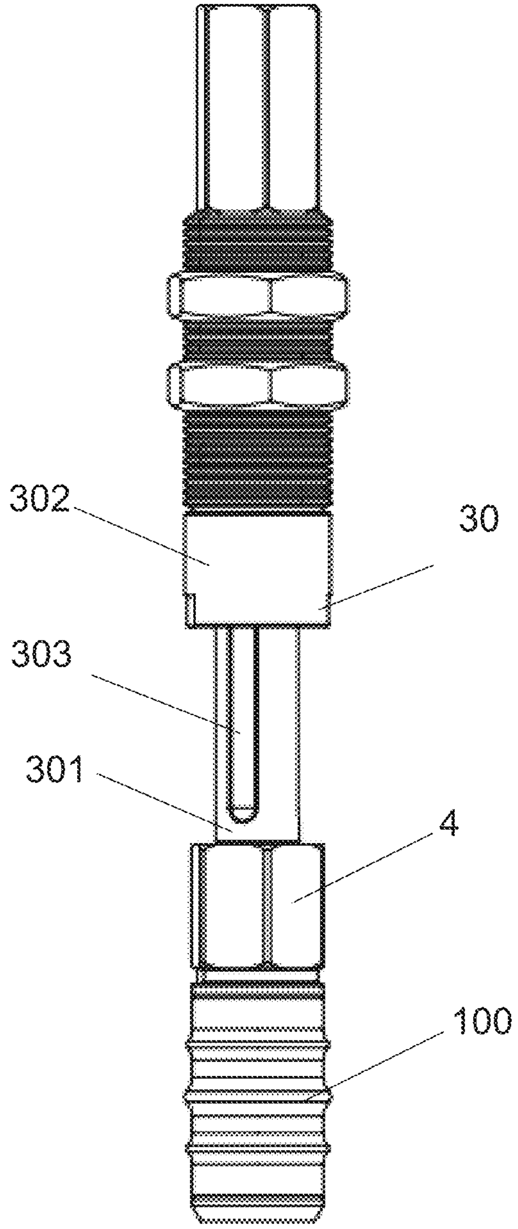
FIG. 19 is a schematic diagram illustrating an exemplary clamp according to some embodiments of the present disclosure.

In some embodiments, as shown in FIG. 19, the inner support clamp 100 may be disposed on the guiding device 30. The guiding device 30 may include a guiding rod 301 and a guiding sleeve 302.

Figure 20:
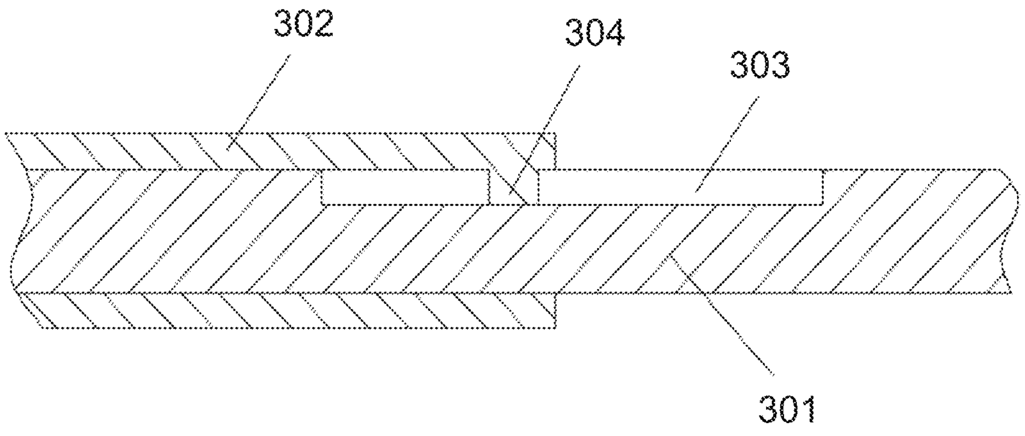
FIG. 20 is a schematic diagram illustrating exemplary guiding rod and a guiding sleeve according to some embodiments of the present disclosure.

In some embodiments, a supporting component (e.g., the supporting component 3 as described in connection with FIGS. 1-4, 7, and 10) and/or the connection component 4 may be connected to the guiding rod 301 such that a first elastic component (e.g., the first elastic component 2 as described in connection with FIGS. 1-4, 6-8, 10, and 12) may move with the expansion and/or contraction of the guiding rod 301. The guiding sleeve 302 may be sleeved on the guiding rod 301 such that the guiding rod 301 may telescopically move in a direction limited by the guiding sleeve 302. In some embodiments, as shown in FIG. 20, a position limiting groove 303 may be disposed on the guiding rod 301 along an axial direction of the guiding rod 301, and a position limiting protrusion 304 may be disposed within the guiding sleeve 302. When the clamp is in a mounting state, the position limiting protrusion 304 may be engaged in the position limiting 303 to prevent the guiding rod 301 from rotating within the guiding sleeve 302, and cause the inner support clamp 100 to telescopically move with the guiding rod 301 along a direction limited by the guiding sleeve 302. In some embodiments, as shown in FIG. 15, the guiding rod 301 and the guiding sleeve 302 may be part the telescoping mechanism 10. For example, the guiding sleeve 302 may be a first sleeve of a telescoping rod of the telescoping mechanism 10, and the guiding rod 301 may be a second sleeve of the telescoping rod. One end of the second sleeve may be inserted into the first sleeve. In some embodiments, the guiding rod 301 and the guiding sleeve 302 may be part of the buffer component 20. For example, the guiding sleeve 302 may be a sleeve located in the buffer component 20, and the guiding rod 301 may be a telescoping rod or a piston rod located in the buffer component 20.

It should be noted that the structure of the guiding device 30 is only exemplary embodiments, and different guiding devices may be used for clamping different objects according to an actual need.

In some embodiments, the clamp may also include an external clamp. More descriptions regarding the external clamp may be found elsewhere in this disclosure, which are not repeated here.

Figure 22:
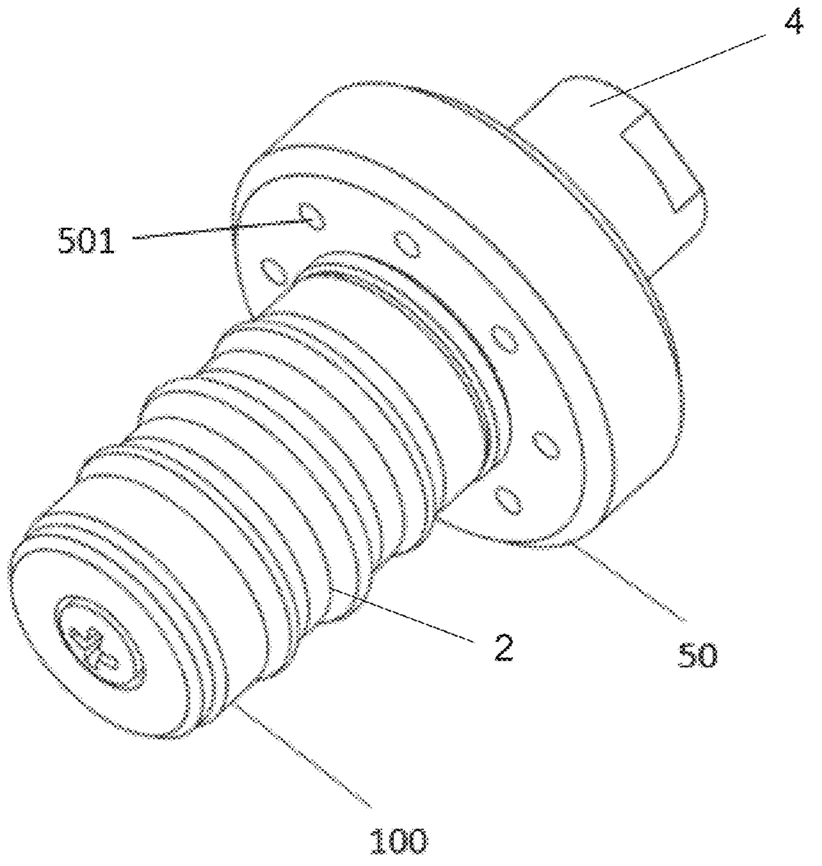
FIG. 22 is a schematic diagram illustrating an exemplary inner support clamp according to some embodiments of the present disclosure.

In some embodiments, a clamp may include an inner support clamp 100 as described above and a disengagement device 50 as shown in FIG. 22.

In some embodiments, after an inner support clamp and/or an external support clamp clamp an object, it is likely that the inner support clamp and/or an external support clamp may be unable to be separated from the object as required, for example, because of the electrostatic adsorption, etc. In such cases, the disengagement device 50 may be disposed outside the inner support clamp and configured to separate the inner support clamp 100 from the object.

In some embodiments, the disengagement device 50 may include an air-jet structure. As shown in FIG. 22, the air-jet structure may be disposed on the inner support clamp 100. The air-jet structure may be connected to an inflation and deflation device when the disengagement device 50 is in use. In some embodiments, the air-jet structure may include a jet nozzle disposed outside the inner support clamp 100. When the jet nozzle is in a mounting state or in use, the jet nozzle may be connected to the inflation and deflation device. Specifically, as shown in FIG. 22, the air-jet structure may include an annular nozzle, and air injection holes 501 may be disposed on the annular nozzle. When the inner support clamp 100 is in a mounting state, the annular nozzle may be connected to the connection component 4, and the annular nozzle may be disposed coaxially with the inner support clamp 100. The air injection holes 501 may be directed toward an outer wall of the first elastic component 2. When the object is clamped, an airbag may be shrunk, and the object may be not fallen off. The jet nozzle may inject air toward the object to separate the object from the inner support clamp 100. As another example, the air-jet structure may include a gas channel formed on the first elastic component 2. When the inner support clamp 100 is in use, the gas channel may be connected to the inflation and deflation device. When the object is sucked up, the airbag may be shrunk, and the object may be not fallen off. The inflation and deflation device may inject air toward the object to separate the object from the inner support clamp 100. The air-jet structure disposed on the inner support clamp 100 may inject air to an adsorption point of the object and the inner support clamp 100 to separate the object from the inner support clamp 100.

In some embodiments, the disengagement device 50 may include a telescoping push rod. The telescoping push rod may be disposed on the inner support clamp 100. For example, the telescoping push rod may be a pneumatic telescoping rod, which may be disposed on the inner support clamp 100 or integrally formed with the inner support clamp 100. When the object is clamped, the airbag may be shrunk, and the object may not separate from the inner support clamp 100. The telescoping push rod may extend to separate the object from the inner support clamp 100.

In some embodiments, the disengagement device 50 may include a vibration device disposed on the inner support clamp 100. In some embodiments, the vibration device may include a micro-vibration device disposed on the inner support clamp 100. When the object is clamped, the airbag may be shrunk, and the object may be not fallen off. The inner support clamp 100 may be vibrated or shook with the micro-vibration device to separate the object from the inner support clamp 100. In some embodiments, the vibration device may have a same structure as or a similar structure to a mobile phone vibrator of a mobile phone.

An inner support clamp according to some embodiments of the present disclosure may include one or more of the following benefits. The inner support clamp may have a small size, a light weight, a simple structure, and a low manufacture cost. An airbag of the inner support clamp may include silica gel, and the inner support clamp with such airbag may be used for clamping different objects with different sizes without causing damage to an object to be clamped by the inner support clamp. The inner support clamp may quickly and stably clamp a fragile and/or soft object, such as a ring-shape object, a bottle-shape object, etc., and not cause damage to the surface of the object. A first elastic component of the inner support clamp may be inserted into the object, the first elastic component may expand to fit with an inner surface of the object and clamp the object. In some embodiments, the first elastic component may include a conformal shape so as to avoid a concentrated force applied to the object and reduce damage to the inner surface of the object. The air pressure of the airbag of the inner support clamp may be adjusted, that is, the amplitude of the force applied by the inner support clamp may be adjusted, and an object with a thin-wall or a fragile object may be clamped safely. Besides, even if a pneumatic system of the inner support clamp is overloaded or a collision occurs between the inner support clamp and the object, the inner support clamp may not damage the object. For an object with a complex contour, the airbag including silica gel may be deformed to fit the object. This may reduce the design complexity of the inner support clamp.

In the above-detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

What is claimed is:

1. An inner support clamp, comprising:

a supporting component; and a first elastic component hermetically covering at least a portion of the supporting component and being placed within an object such that the first elastic component expands outward to generate a clamping force on an inner surface of the object when the first elastic component is inflated by an inflation and deflation device.

2. The inner support clamp of claim 1, wherein a reinforcing component is disposed on at least one of an outer wall or an inner wall of the first elastic component; and at least one of a wear layer, an anti-indentation layer, an oil-proof layer, or an anti-static layer is disposed on the outer wall of the first elastic component.

3. The inner support clamp of claim 2, wherein the reinforcing component includes at least one of a reinforcing rib or a rough surface, and the at least one of the reinforcing rib or the rough surface is disposed on the first elastic component.

4. The inner support clamp of claim 1, wherein a waist of the first elastic component is concaved when the inner support clamp is in a mounting state; or the first elastic component has a conformal shape when the inner support clamp is in the mounting state.

5. The inner support clamp of claim 1, wherein an internal concave portion is disposed in a central part of the supporting component, and a chamber is formed between the first elastic component and the supporting component.

6. The inner support clamp of claim 1, wherein a clamping part is disposed on the supporting component, and an end of the first elastic component is engaged with the clamping part when the inner support clamp is in a mounting state, and the first elastic component hermetically covers at least a portion of the supporting component.

7. The inner support clamp of claim 1, wherein a gas channel is disposed within the supporting component; and a chamber formed between the first elastic component and the supporting component is connected to the inflation and deflation device through the gas channel.

8. The inner support clamp of claim 1, wherein the inner support clamp further includes a connection component, and the connection component is connected to the supporting component and configured to connect the inner support clamp to an external device.

9. The inner support clamp of claim 8, wherein the connection component includes an upper connection unit and a lower connection unit, the upper connection unit is connected to the external device, and the lower connection unit is connected to a connection part disposed on the supporting component.

10. The inner support clamp of claim 9, wherein the upper connection unit includes a thread connection unit or an engagement connection unit; and the lower connection unit includes a second thread connection unit or a second engagement connection unit.

11. The inner support clamp of claim 9, wherein the connection component further includes a crimping unit, the crimping unit includes a protrusion unit formed between the upper connection unit and the lower connection unit, the protrusion unit protruding outward along a radial direction of the inner support clamp;

the crimping unit presses the first elastic component against the supporting component when the inner support clamp is in a mounting state.

12. The inner support clamp of claim 8, wherein a gas channel is disposed in the connection component, and a chamber formed between the first elastic component and the supporting component is connected to the inflation and deflation device through the gas channel.

13. The inner support clamp of claim 1, wherein the inner support clamp includes a sealing component, and the sealing component is disposed at a joint between the first elastic component and the supporting component to seal the inner support clamp.

14. The inner support clamp of claim 1, wherein the inner support clamp further includes a gas supplying interface, and a chamber formed between the first elastic component and the supporting component is connected to the inflation and deflation device through the gas supplying interface.

15. The inner support clamp of claim 1, wherein the inner support clamp further includes a telescoping mechanism, and the supporting component is connected to the telescoping mechanism directly or via a connection component of the inner support clamp.

16. The inner support clamp of claim 1, wherein the inner support clamp further includes a buffer component, and the supporting component is connected to the buffer component directly or via a connection component of the inner support clamp.

17. A clamp, comprising the inner support clamp of claim 1 and an external clamp, wherein the external clamp is disposed on the inner support clamp.

18. A clamp, comprising the inner support clamp of claim 1 and a guiding device, wherein the guiding device is detachably disposed on the inner support clamp.

19. A clamp, comprising the inner support clamp of claim 1 and a disengagement device, wherein the disengagement device includes an air-jet structure, the air-jet structure is disposed on the inner support clamp, and the air-jet structure is connected to the inflation and deflation device when the disengagement device is in use; or the disengagement device includes a telescoping push rod, and the telescopic push rod is disposed on the inner support clamp; or the disengagement device includes a vibration device, and the inner support clamp is disposed on the vibration device.

20. The inner support clamp of claim 1, wherein a connection component of the inner support clamp is connected to one or more second clamps.

* * * * *